US007264157B2

(12) United States Patent
Ishizuka

(10) Patent No.: US 7,264,157 B2
(45) Date of Patent: Sep. 4, 2007

(54) AREA-BASED CONTENT DELIVERY METHOD AND SYSTEM

(75) Inventor: Eiichi Ishizuka, Tokyo (JP)

(73) Assignee: Nec Corporation, Tokyo (JP)

( * ) Notice: Subject to any disclaimer, the term of this patent is extended or adjusted under 35 U.S.C. 154(b) by 234 days.

(21) Appl. No.: 10/755,274

(22) Filed: Jan. 13, 2004

(65) Prior Publication Data
US 2004/0140353 A1 Jul. 22, 2004

(30) Foreign Application Priority Data
Jan. 17, 2003 (JP) ............................. 2003-009140

(51) Int. Cl.
G06Q 30/00 (2006.01)
H04Q 7/20 (2006.01)
H04M 1/66 (2006.01)
H04M 1/68 (2006.01)
H04M 3/16 (2006.01)

(52) U.S. Cl. .................. 235/383; 235/375; 455/456.1; 455/410; 705/26; 705/27

(58) Field of Classification Search ........ 235/381–383, 235/385, 378, 375; 705/26, 14, 16, 21–23, 705/27; 455/456.1, 410
See application file for complete search history.

(56) References Cited
U.S. PATENT DOCUMENTS 5,732,326 A * 3/1998 Maruyama et al. ........ 455/66.1
5,740,369 A * 4/1998 Yokozawa et al. .......... 709/217
6,367,694 B1 * 4/2002 Roslak ........................ 235/380
6,513,015 B2 * 1/2003 Ogasawara ................... 705/26
6,550,672 B1 * 4/2003 Tracy et al. ................. 235/383
6,647,269 B2 * 11/2003 Hendrey et al. ........... 455/456.3
6,745,943 B2 * 6/2004 Schlieffers et al. ..... 235/472.01
6,792,280 B1 * 9/2004 Hori et al. .................. 455/517
6,813,503 B1 * 11/2004 Zillikens et al. ............ 455/457
6,859,791 B1 * 2/2005 Spagna et al. ................ 705/51
6,937,998 B1 * 8/2005 Swartz et al. ................. 705/26
6,947,976 B1 * 9/2005 Devitt et al. ................ 709/219
6,993,326 B2 * 1/2006 Link et al. ................ 455/414.1
7,072,672 B1 * 7/2006 Vanska et al. ............. 455/456.3
7,130,622 B2 * 10/2006 Vanska et al. ............... 455/419
7,178,726 B2 * 2/2007 Matsumoto ................. 235/383

(Continued)

FOREIGN PATENT DOCUMENTS
JP 2002-024666 1/2002

(Continued)

Primary Examiner—Daniel Walsh
(74) Attorney, Agent, or Firm—Young & Thompson

(57) ABSTRACT

A content usage right issuing terminal (2) issues a content usage right to a portable terminal (3) of a user who visits a store. In response to a request from the portable terminal (3) that has the content usage right, an in-store server (1) sends a content to the portable terminal (3) via a wireless LAN (7). Because the in-store server (1) limits the content transmission area to within a store (5), only portable terminals in the store (5) can receive the delivery of the content. When a user carrying the portable terminal (3) that has the content usage right leaves the store (5), the in-store server (1) detects the fact and invalidates the content usage right issued to the portable terminal (3).

16 Claims, 18 Drawing Sheets

U.S. PATENT DOCUMENTS

| | | | |
|---|---|---|---|
| 2001/0014870 A1* | 8/2001 | Saito et al. | 705/14 |
| 2001/0027415 A1* | 10/2001 | Ito | 705/14 |
| 2002/0010631 A1* | 1/2002 | Sato et al. | 705/14 |
| 2002/0010756 A1* | 1/2002 | Oku | 709/217 |
| 2002/0016740 A1* | 2/2002 | Ogasawara | 705/26 |
| 2002/0052786 A1* | 5/2002 | Kim et al. | 705/14 |
| 2002/0065713 A1* | 5/2002 | Awada et al. | 705/14 |
| 2002/0069127 A1* | 6/2002 | Enari | 705/26 |
| 2002/0095333 A1* | 7/2002 | Jokinen et al. | 705/14 |
| 2002/0133418 A1* | 9/2002 | Hammond et al. | 705/26 |
| 2002/0161633 A1* | 10/2002 | Jacob et al. | 705/14 |
| 2002/0178091 A1* | 11/2002 | O'Hagan et al. | 705/27 |
| 2002/0198851 A1* | 12/2002 | Hashimoto | 705/400 |
| 2003/0018711 A1* | 1/2003 | Imanishi | 709/203 |
| 2003/0023578 A1* | 1/2003 | Durand et al. | 707/1 |
| 2003/0060190 A1* | 3/2003 | Mallart | 455/414 |
| 2003/0083954 A1* | 5/2003 | Namba | 705/26 |
| 2003/0132298 A1* | 7/2003 | Swartz et al. | 235/472.02 |
| 2003/0163399 A1* | 8/2003 | Harper et al. | 705/35 |
| 2003/0163522 A1* | 8/2003 | Nakamura et al. | 709/203 |
| 2003/0216963 A1* | 11/2003 | Ishiwaka et al. | 705/14 |
| 2004/0002897 A1* | 1/2004 | Vishik | 705/14 |
| 2004/0030930 A1* | 2/2004 | Nomura | 713/201 |
| 2004/0077361 A1* | 4/2004 | Ishidoshiro | 455/456.3 |
| 2004/0083494 A1* | 4/2004 | Sakurai | 725/126 |
| 2004/0093274 A1* | 5/2004 | Vanska et al. | 705/26 |
| 2004/0111320 A1* | 6/2004 | Schlieffers et al. | 705/16 |
| 2004/0140353 A1* | 7/2004 | Ishizuka | 235/383 |
| 2004/0143652 A1* | 7/2004 | Grannan et al. | 709/223 |
| 2004/0167820 A1* | 8/2004 | Melick et al. | 705/16 |
| 2004/0198369 A1* | 10/2004 | Kwak et al. | 455/452.2 |
| 2004/0224705 A1* | 11/2004 | Nishimura | 455/466 |
| 2004/0252051 A1* | 12/2004 | Johnson | 342/357.09 |
| 2005/0040230 A1* | 2/2005 | Swartz et al. | 235/383 |
| 2005/0047373 A1* | 3/2005 | Kojima | 370/331 |
| 2005/0071253 A1* | 3/2005 | Yang | 705/27 |
| 2005/0116030 A1* | 6/2005 | Wada et al. | 235/382 |
| 2005/0134453 A1* | 6/2005 | Yamada | 340/539.13 |
| 2005/0149751 A1* | 7/2005 | Ochi et al. | 713/200 |
| 2005/0222918 A1* | 10/2005 | Vanska et al. | 705/26 |
| 2005/0261976 A1* | 11/2005 | Suzuki | 705/24 |
| 2006/0058036 A1* | 3/2006 | Watanabe et al. | 455/456.1 |
| 2006/0064910 A1* | 3/2006 | Shankle | 40/594 |
| 2006/0116965 A1* | 6/2006 | Kudo et al. | 705/52 |
| 2006/0138224 A1* | 6/2006 | Azami et al. | 235/385 |
| 2006/0143266 A1* | 6/2006 | Ohto et al. | 709/203 |
| 2006/0149632 A1* | 7/2006 | Register et al. | 705/14 |
| 2006/0277098 A1* | 12/2006 | Chung et al. | 705/14 |

FOREIGN PATENT DOCUMENTS

| | | |
|---|---|---|
| JP | 2002-176403 | 6/2002 |
| JP | 2003-228637 | 8/2003 |
| JP | 2004220464 | * 8/2005 |

* cited by examiner

FIG. 17

2008 CONTENT-BASED BY-STORE ACCESS RECORD

| CONTENT | STORE a | STORE b | • • • | STORE n |
|---|---|---|---|---|
| CONTENT X | 50 TIMES | 20 TIMES | • • • | 10 TIMES |
| CONTENT Y | 10 HOURS | 5 HOURS | • • • | 3 HOURS |
| ⋮ | ⋮ | ⋮ | ⋮ | ⋮ |
| CONTENT Z | 0 TIME | 1 TIME | • • • | 0 TIME |

FIG. 18

3006 ACCESS RECORD TABLE

| CONTENT PROVIDING SERVER <br> 3111 | CONTENT <br> 3112 | STORE a <br> 3113 | STORE b <br> 3113 | • • • | STORE n <br> 3113 |
|---|---|---|---|---|---|
| CONTENT PROVIDING SERVER P | CONTENT X | 50 TIMES | 20 TIMES | • • • | 10 TIMES |
| CONTENT PROVIDING SERVER P | CONTENT Y | 10 HOURS | 5 HOURS | • • • | 3 HOURS |
| ⋮ | ⋮ | ⋮ | ⋮ | ⋮ | ⋮ |
| CONTENT PROVIDING SERVER Q | CONTENT m | 7 HOURS | 12 HOURS | • • • | 6 HOURS |
| ⋮ | ⋮ | ⋮ | ⋮ | ⋮ | ⋮ |

AREA-BASED CONTENT DELIVERY METHOD AND SYSTEM

FIELD OF THE INVENTION

The present invention relates to an area-based content delivery method and an area-based content delivery system for delivering various types of content to the portable terminal of a user who visits a store such as a fast food store or a department store.

BACKGROUND OF THE INVENTION

Conventionally, a technology is known for this type of area-based content delivery method that is implemented by building a wireless LAN in a limited area, such as a book store or a restaurant, as described in JP Patent Kokai Publication JP-P2002-176403A (Patent document 1) that will be described later. In this method, content is delivered from a content server on the Internet or the like to a portable terminal in that area through the base station of the area in broadcasting mode (hereinafter, called a first conventional technology).

Japanese Patent Application No. 2002-25306 (Japanese Patent Kokai Publication JP-P2003-228637A • Patent document 2) describes an area-based content delivery method creating an ID and a password for a user visiting a store to access an in-store wireless LAN. According to the method, it is possible to manage the time allotted to each user to access the LAN and to allow only permitted users to access an information server installed in the store only for a limited period of time (hereinafter called a second conventional technology).

A technology for managing access to content on a time basis is described also in Japanese Patent Kokai Publication JP-P2002-24666A (Patent document 3) that will be described later. Japanese Patent Kokai Publication JP-P2002-24666A also discloses a method for limiting access to content on an access count basis (hereinafter called a third conventional technology).

[Patent Document 1]
Japanese Patent Kokai Publication JP-P2002-176403A

[Patent Document 2]
Japanese Patent Application No. 2002-25306
(Japanese Patent Kokai Publication JP-P2003-228637A)

[Patent Document 3]
Japanese Patent Kokai Publication JP-P2002-24666A

SUMMARY OF THE DISCLOSURE

As one of customer services, there has been a need for providing, under a certain condition, the content delivery service only to users who have bought products, or have used the services, in a store. The first conventional technology, which delivers content to all portable terminals in a store in broadcasting mode, cannot be used when it is desired that the content be delivered only to limited users. By contrast, the second conventional technology can deliver content only to the users, who have an ID and a password for accessing an in-store wireless LAN, only for a limited period of time. Applying the third conventional technology to the second conventional technology makes it possible to control content delivery not only on a time basis but also on an access count basis. However, under those conventional technologies, if a user who has not yet used up the allotted time or access count once leaves a store and, at a later time, visits the store again and requests to access the content, the user can receive the contents delivery service. A problem is that the content delivery service is provided to a user who buys something once and the revisiting user buying nothing. Another problem is that, if a user who leaves the store passes the portable terminal to another, the user who has received the portable terminal can receive the content delivery service when he or she visits the store.

In view of the foregoing, it is an object of the present invention to provide an area-based content delivery method and an area-based content delivery system that provide the content delivery service only to users who have been staying in a store.

According to a first aspect of the present invention, a first area-based content delivery method comprises the steps of (a) issuing, by a content usage right issuing terminal, a content usage right to a portable terminal of a user who visits a store; (b) in response to a request from the portable terminal having the content usage right, sending a content to the requesting portable terminal by an in-store server whose content transmission area covers inside of the store; and (c) detecting, by the in-store server, whether the portable terminal having the content usage right has left the store and, if the portable terminal has left the store, invalidating the content usage right issued to the portable terminal.

In the area-based content delivery method, the content usage right issuing terminal issues a content usage right to the portable terminal of a user who visits a store and, in response to a request from the portable terminal to which the content usage right has been issued, the in-store server sends a content to the portable terminal. The in-store server, whose content transmission area covers inside of the store, can send the content only to a portable terminal that is in the store. When the user carrying the portable terminal to which the content usage right has been issued leaves the store, the in-store server detects the fact and invalidates the content usage right that has been issued to the portable terminal. This method prevents the user or another user, who carries the portable terminal, visits the store again, from receiving the content delivery service; to receive the service, the user must have the content usage right issued again.

According to the area-based content delivery method mentioned above, in step (c), the in-store server regularly sends inquiry data to the portable terminal having the content usage right and detects that, if no response is returned, the portable terminal has left the store. This method automatically detects that the portable terminal having the content usage right has left the store and invalidates the content usage right.

In the area-based content delivery methods mentioned above, the content usage right may include a use condition composed of at least one of a maximum use time and a maximum use count. And wherein, in step (b), the in-store server can check the use condition to determine whether to send the content. This method allows even a user, who has been staying in the store, to receive the content delivery service under the limitation of the use time or the use count.

In the area-based content delivery methods mentioned above, in step (a), the content usage right issuing terminal issues the content usage right when a content usage right issuing request is received from a cash register terminal. This method enables to control the issuance of the content usage right from the content usage right issuing terminal through the operation of a cash register terminal in the store, to reduces the number of operators on the content usage right issuing terminal, and to reliably issues the content usage right only to users who have bought products or the like in the store.

In the area-based content delivery method mentioned above, in step (a), the content usage right issuing terminal issues the content usage right when a content usage right issuing request is received from a cash register terminal. In this invention, said content usage right issuing request includes a total amount paid by a customer. Thus, the content usage right including the use condition will be determined according to the total amount. This method automatically controls the use condition flexibly according to the total amount of purchased products or the like.

In the area-based content delivery methods mentioned above, in step (b), the in-store server acquires the content to be sent to the portable terminal from a content server installed outside the store and sends the content to the portable terminal. This method eliminates the need for each in-store server to hold and manage the contents but allows the contents to be integrally held and managed in the external content server.

In the area-based content delivery methods mentioned above, the content sent by the content server to the in-store server is an advertisement-included content provided by one of a plurality of content providing servers, wherein the content server creates a content-based store-by-store access record for each content providing server and sends the created record to the content providing server, and wherein the content providing server calculates an advertisement rate to be paid to each store based on the received content-based store-by-store access record. This method allows the operator of a content providing server to pay an advertisement rate to each store, where advertisement-included contents are actually accessed, according to the use status.

According to a second aspect of the present invention, an area-based content delivery system comprises a content usage right issuing terminal that issues a content usage right to a portable terminal of a user who visits a store; and an in-store server whose content transmission area covers inside of the store and which, in response to a request from the portable terminal having the content usage right, sends a content to the requesting portable terminal, wherein the in-store server comprises a detecting unit for detecting whether the portable terminal having the content usage right has left the store; and a usage right invalidating unit for invalidating the content usage right issued to the portable terminal if the portable terminal has left the store.

In the area-based content delivery system, the content usage right issuing terminal issues a content usage right to the portable terminal of a user who visits a store and, in response to a request from the portable terminal to which the content usage right has been issued, the in-store server sends a content to the portable terminal. The in-store server, whose content transmission area covers inside of the store, can send the content only to a portable terminal that is in the store. When the user carrying the portable terminal to which the content usage right has been issued leaves the store, the in-store server detects the fact by the detecting unit and the usage right invalidating unit invalidates the content usage right that has been issued to the portable terminal. This system prevents the user or another user, who carries the portable terminal and visits the store again, from receiving the content delivery service; to receive the service, the user must have the content usage right issued again.

In the area-based content delivery system mentioned above, the detecting unit regularly sends inquiry data to the portable terminal having the content usage right and detects that, if no response is returned, the portable terminal has left the store. This system automatically detects that the portable terminal having the content usage right has left the store and invalidates the content usage right.

In the area-based content delivery systems mentioned above, the content usage right issuing terminal issues the content usage right including a use condition composed of at least one of a maximum use time and a maximum use count. And wherein the in-store server checks the use condition included in the content usage right to determine whether to send the content. This system allows even a user, who has been staying in the store, to receive the content delivery service under the limitation of the use time or the use count.

In the area-based content delivery systems mentioned above, the content usage right issuing terminal issues the content usage right when a content usage right issuing request is received from a cash register terminal. This system enables to control the issuance of the content usage right from the content usage right issuing terminal through the operation of a cash register terminal in the store, to reduces the number of operators on the content usage right issuing terminal, and to reliably issues the content usage right only to users who have bought products or the like in the store.

In the area-based content delivery system mentioned above, the content usage right issuing terminal issues the content usage right when a content usage right issuing request is received from a cash register terminal. In this invention, said content usage right issuing request includes a total amount paid by a customer. Thus, the content usage right including the use condition will be determined according to the total amount. This system automatically controls the use condition flexibly according to the total amount of purchased products or the like.

In the area-based content delivery systems mentioned above, the in-store server acquires the content to be sent to the portable terminal from a content server installed outside the store and sends the content to the portable terminal. This system eliminates the need for each in-store server to hold and manage the contents but allows the contents to be integrally held and managed in the external content server.

In the area-based content delivery systems mentioned above, the content sent by the content server to the in-store server is an advertisement-included content provided by one of a plurality of content providing servers. The content server creates a content-based store-by-store access record for each content providing server and sends the created record to the content providing server, and wherein the content providing server calculates an advertisement rate to be paid to each store based on the received content-based store-by-store access record. This system allows the operator of a content providing server to pay an advertisement rate to each store, where advertisement-included contents are actually accessed, according to the use status.

According to a third aspect of the present invention, an in-store server comprises a content sending unit whose content transmission area is limited to within a store and which, in response to a request from a portable terminal having a content usage right, sends a content to the requesting portable terminal; a detecting unit for detecting whether the portable terminal having the content usage right has left the store; and a usage right invalidating unit for invalidating the content usage right of the portable terminal if the portable terminal has left the store. This server provides the content delivery service only to the portable terminal of a user who has been staying in the store and, when the user leaves the store, invalidates the content usage right.

In the in-store server mentioned above, the detecting unit regularly sends inquiry data to the portable terminal having the content usage right and detects that, if no response is returned, the portable terminal has left the store. This server automatically detects that the portable terminal having the content usage right has left the store and invalidates the content usage right.

According to a fourth aspect of the present invention, a portable terminal comprises a storage unit for storing content usage right data issued from a content usage right issuing terminal; a content requesting unit for requesting an in-store server, whose content transmission area covers inside of a store, to send a content, the in-store server being identified by available server information included in the content usage right data stored in the storage unit; and a response unit for returning a response to the in-store server when inquiry data is received, the inquiry data being regularly sent by the in-store server to detect whether the portable terminal has left the store and, if the portable terminal has left the store, to invalidate the usage right of the portable terminal. Therefore, when the portable terminal is brought out of the store, the content usage right can be invalidated.

According to a fifth aspect of the present invention, a content usage right issuing terminal comprises communication unit for communication with a cash register terminal; and usage right issuing unit for issuing a content usage right. And the usage right issuing unit issues a content usage right including a use condition composed of at least one of a maximum use time and a maximum use count is issued when a request to issue the content usage right to be processed by an in-store server is received from the cash register terminal. The content transmission area of an in-store server covers inside of a store and the in-store server can detect whether the portable terminal having the content usage right has left the store and invalidates the content usage right if the portable terminal has left. Wherein, in response to a request from a portable terminal having the content usage right, the in-store server sends content to the requesting terminal. The content usage right issuing terminal can control the issuance of the content usage right through the operation of a cash register terminal in the store. Therefore, the content usage right issuing terminal can provide the content delivery service only to the portable terminal of a user who has been staying in the store. Furthermore, the content usage right issuing terminal can reduce the number of operators on the content usage right issuing terminal, and reliably issue the content usage right only to users who have bought products or the like in the store. In addition, the content usage right issuing terminal allows even a user, who has been staying in the store, to receive the content delivery service under the limitation of the use time or the use count.

In the content usage right issuing terminal mentioned above, the usage right issuing unit issues the content usage right when a content usage right issuing request is received from a cash register terminal. In this invention, said content usage right issuing request includes a total amount paid by a customer. Thus, the content usage right including the use condition will be determined according to the total amount. This system automatically controls the use condition flexibly according to the total amount of purchased products or the like.

According to a sixth aspect of the present invention, a content server comprises content delivery unit connected to a plurality of in-store servers via a network and delivering a content. The content transmission area of each in-store server covers inside of own store and the in-store server sent a content to a portable terminal in response to a request from a portable terminal having a content usage right. And the in-store server detects whether the portable terminal having the content usage right has left the store, and, if the portable terminal has left the store, invalidates the content usage right of the portable terminal. This server eliminates the need for each in-store server to hold and manage the contents but allows the contents to be integrally held and managed in the content server.

The content server mentioned above, further comprises an access recording unit for monitoring the content delivery status of the content delivery unit and for generating a content-based store-by-store access record. This content server allows the content-based store-by-store access records to be recorded in one content server.

The content servers mentioned above, further comprises a content receiving unit for receiving the content to be delivered to the in-store server from a content providing server; and an access record sending unit for sending the content-based store-by-store access record of contents which are received from said content providing server. This server allows the operator of the content providing server to keep track of how and in which store the contents provided to the content server have been used.

BRIEF DESCRIPTION OF THE DRAWINGS

FIG. 17 is a diagram showing an example of a content-based store-by-store access record.

FIG. 18 is a diagram showing an example of an access record table.

PREFERRED EMBODIMENTS OF THE INVENTION

Some embodiments of the present invention will be described in detail with reference to the drawings.

First Embodiment

Figure 1:
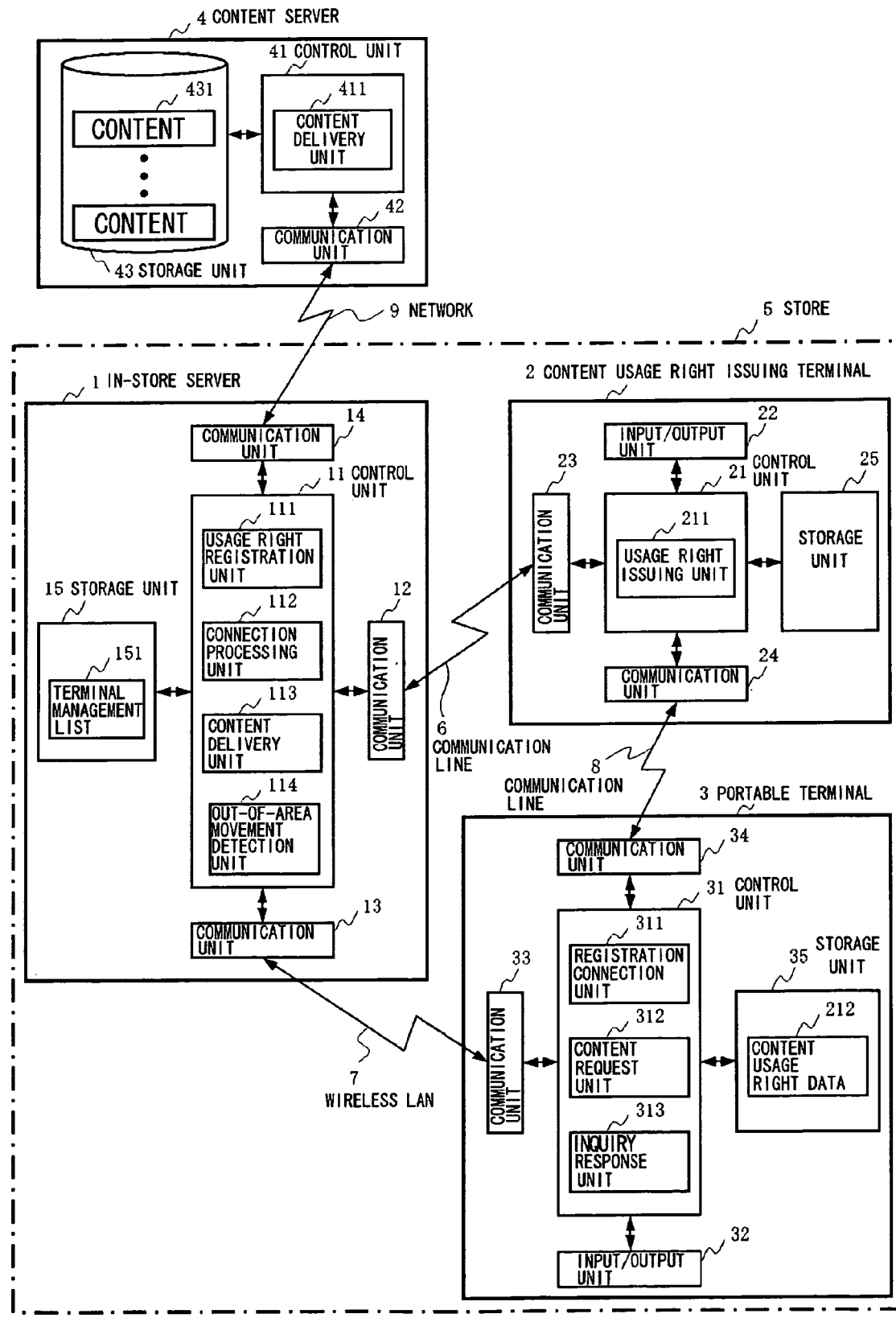
FIG. 1 is a block diagram showing an area-based content delivery system in a first embodiment of the present invention.

Referring to FIG. 1, an area-based content delivery system in a first embodiment of the present invention comprises an in-store server 1, a content usage right issuing terminal 2, a portable terminal 3, and a content server 4. The in-store server 1 and the content usage right issuing terminal 2 are installed in a store 5 such as a fast food store or a department store, while the content server 4 is installed in any place other than the store 5. The in-store server 1 and the content usage right issuing terminal 2 are connected via a communication line 6, and the in-store server 1 and the content server 4 are connected via a network 9. In addition, the in-store server 1 and the portable terminal 3 are connected via a wireless LAN 7, and the content usage right issuing terminal 2 and the portable terminal 3 are connected via a communication line 8.

The content usage right issuing terminal 2 is a terminal that issues a content usage right so that a customer who visits the store 5 can receive the content delivery service using the portable terminal 3. The content usage right issuing terminal 2 comprises a control unit 21 including the CPU; and an input/output unit 22, communication units 23 and 24, and a storage unit 25 connected to the control unit 21. The input/output unit 22 is, for example, a keyboard and a display unit. The communication unit 23 is communication means for wired or wireless communication with the in-store server 1. The communication unit 24 is communication means for wired or wireless communication with the portable terminal 3. The storage unit 25 is a unit such as a magnetic disk drive in which programs and data necessary for processing executed by the control unit 21 are stored. The control unit 21 has a usage right issuing unit 211 that issues content usage right data in response to an instruction from the input/output unit 22.

Figure 2:
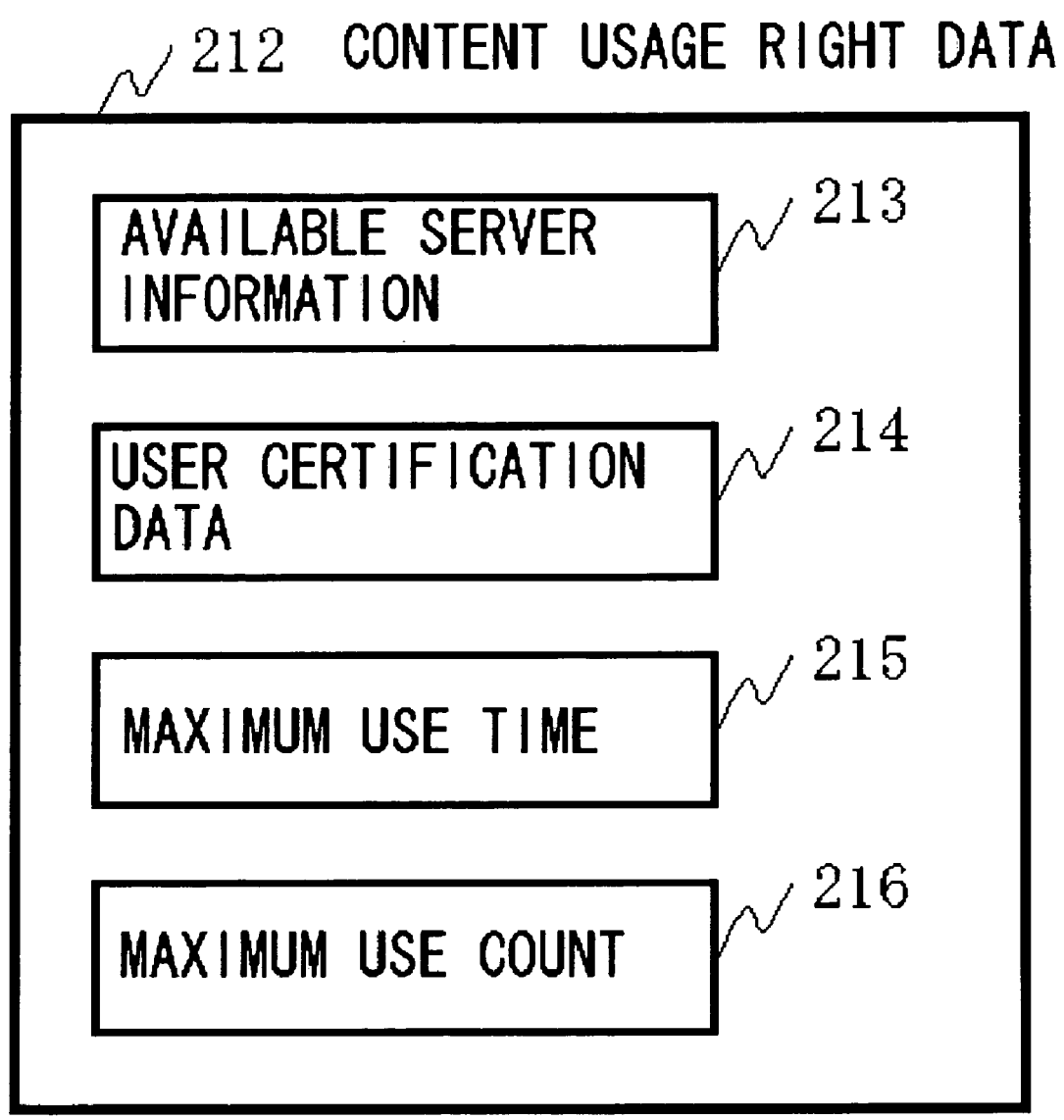
FIG. 2 is a diagram showing an example of content usage right data.

FIG. 2 shows an example of content usage right data 212 issued by the usage right issuing unit 211. The content usage right data 212 in this example includes available server information 213, user certification data 214, maximum use time 215, and maximum use count 216. The available server information 213, which is information identifying the in-store server 1 to be connected when a user wants to use the content delivery service through the portable terminal 3, includes information such as the address of the in-store server 1. The user certification data 214, which is user certification data required to connect to the in-store server 1, includes information such as a user ID unique to each content usage right. The maximum use time 215 and the maximum use count 216 are the maximum length of time and the maximum number of times the user can receive the content delivery service. Note that, in this embodiment, the type of available contents is classified into two: use-time limited contents and use-count limited contents. The maximum use time 215 indicates the maximum length of time during which a use-time limited content can be used, while the maximum use count 216 indicates the maximum number of times a use-count limited content can be used. An example of use-time limited contents is a moving picture content. An example of use-count limited content is a game content.

Figure 3:
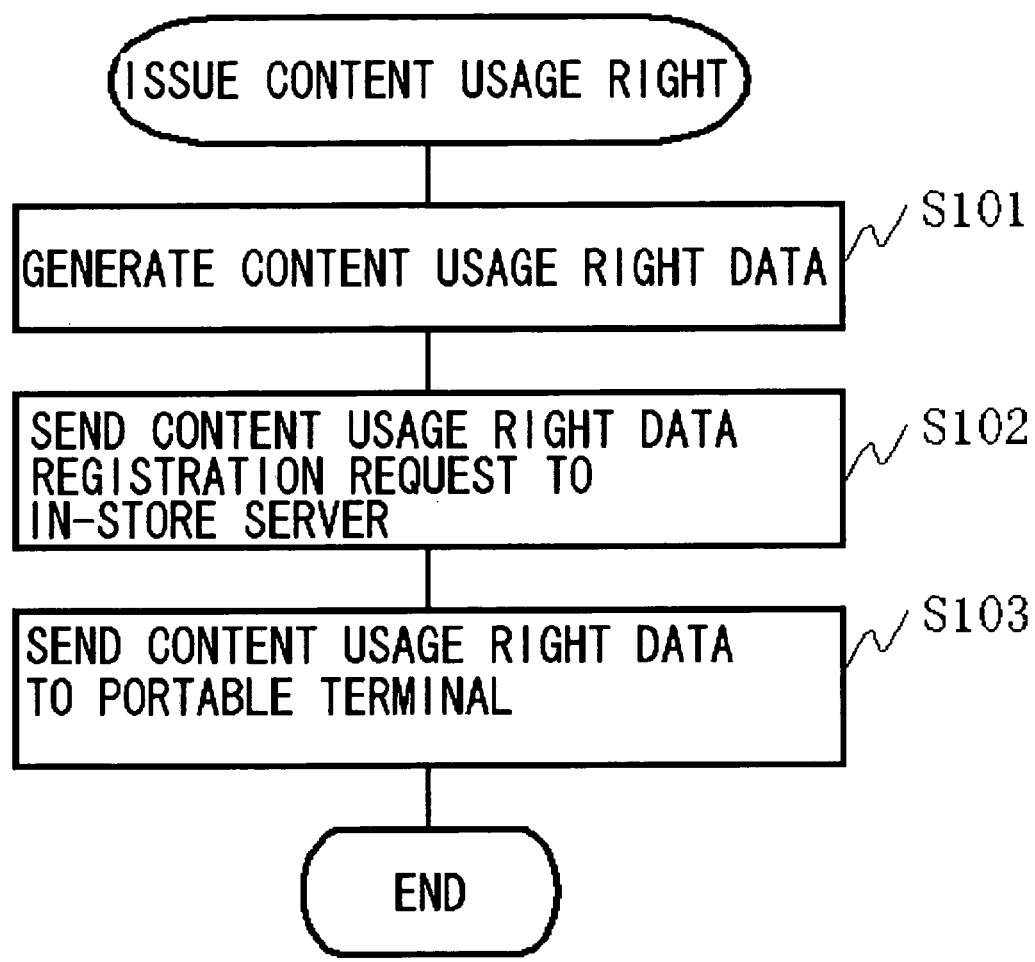
FIG. 3 is a flowchart showing an example of processing of a usage right issuing unit of a content usage right issuing terminal.

FIG. 3 is a flowchart showing an example of processing executed by the usage right issuing unit 211 of the content usage right issuing terminal 2. When a salesperson of the store 5 instructs from the input/output unit 22 to issue a content usage right, the usage right issuing unit 211 generates unique user certification data 214 and adds pre-set available server information 213, maximum use time 215, and maximum use count 216 to the generated user certification data 214 to generate the content usage right data 212 such as the one shown in FIG. 2 (S101). Next, the usage right issuing unit 211 uses the communication unit 23 to send a usage right registration request, for which the generated content usage right data 212 is specified, to the in-store server 1 via the communication line 6 (S102). And the usage right issuing unit 211 uses the communication unit 24 to send the generated content usage right data 212 to the portable terminal 3 via the communication line 8 (S103). The content usage right data 212 sent to the in-store server 1 need not include the available server information 213, and the content usage right data 212 sent to the portable terminal 3 need not include the maximum use time 215 and the maximum use count 216. The portable terminal 3 to which the content usage right data 212 is sent is the portable terminal 3 of a customer to which the content delivery service is to be provided. The information specifying the portable terminal 3 is inputted from the input/output unit 22, and the usage right issuing unit 211 sends the content usage right data 212 to the specified portable terminal 3.

The portable terminal 3, for example, a cellular phone or a portable information terminal, comprises a control unit 31 including the CPU; and an input/output unit 32, communication units 33 and 34, and a storage unit 35, connected to the control unit 31 respectively. The input/output unit 32 is, for example, a keyboard and a display unit. The communication unit 33 is means for communication with the in-store server 1 via the wireless LAN 7. The communication unit 34, means for communication with the content usage right issuing terminal 2, is a unit with a communication system similar to that of the communication unit 24 of the content usage right issuing terminal 2. The storage unit 35 is composed of a memory in which programs and data necessary for processing executed by the control unit 31 are stored. The control unit 31 comprises a registration connection unit 311 that receives content usage right data from the content usage right issuing terminal 2 to execute required processing; a content request unit 312 that requests the in-store server 1 to send a content and plays back the received content on the input/output unit 32; and a inquiry response unit 313 that returns a response to the in-store server 1 in response to inquiry data from the in-store server 1.

Figure 4:
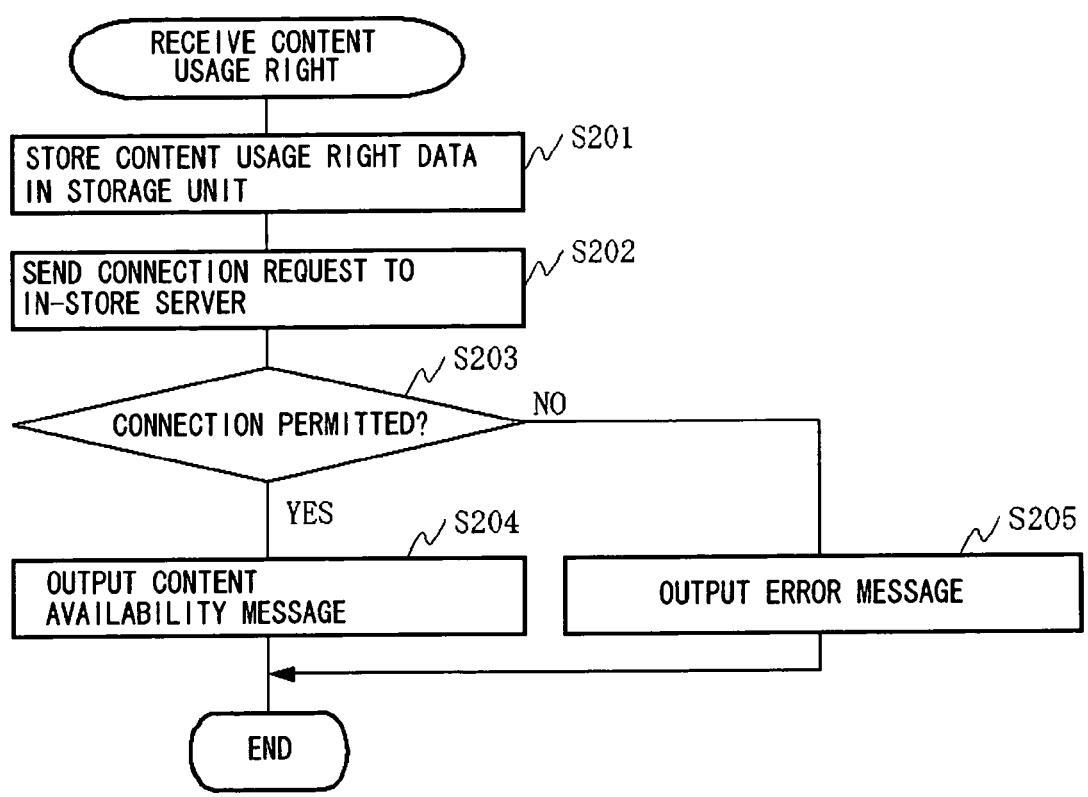
FIG. 4 is a flowchart showing an example of processing of a registration connection unit of a portable terminal.

FIG. 4 is a flowchart showing an example of processing executed by the registration connection unit 311 of the portable terminal 3. In response to the content usage right data 212 from the content usage right issuing terminal 2 via the communication unit 34, the registration connection unit 311 stores the received content usage right data 212 in the storage unit 35 (S201). The maximum use time 215 and the maximum use count 216 included in the content usage right data 212 stored in the storage unit 35 can also be confirmed by displaying them on the input/output unit 32 through the operation of the input/output unit 32. Next, the registration connection unit 311 uses the communication unit 33 to send, via the wireless LAN 7, a connection request, for which the user certification data 214 in the content usage right data 212 and the terminal ID that is the address of the terminal 3 are specified, to the in-store server 1 whose address is identified by the available server information 213 in the content usage right data 212 stored in the storage unit 35 (S202). After receiving a connection permission from the in-store server 1, with which a connection is to be established, and successfully connecting to the in-store server 1 (YES in S203), the registration connection unit 311 outputs a message from the input/output unit 32 to indicate that the content is now available for use (S204). On the other hand, if a connection rejection message is received from the in-store server 1 with which a connection is to be made (NO in S203), the registration connection unit 311 outputs an error message from the input/output unit 32 to indicate that the connection has failed (S205).

Figure 5:
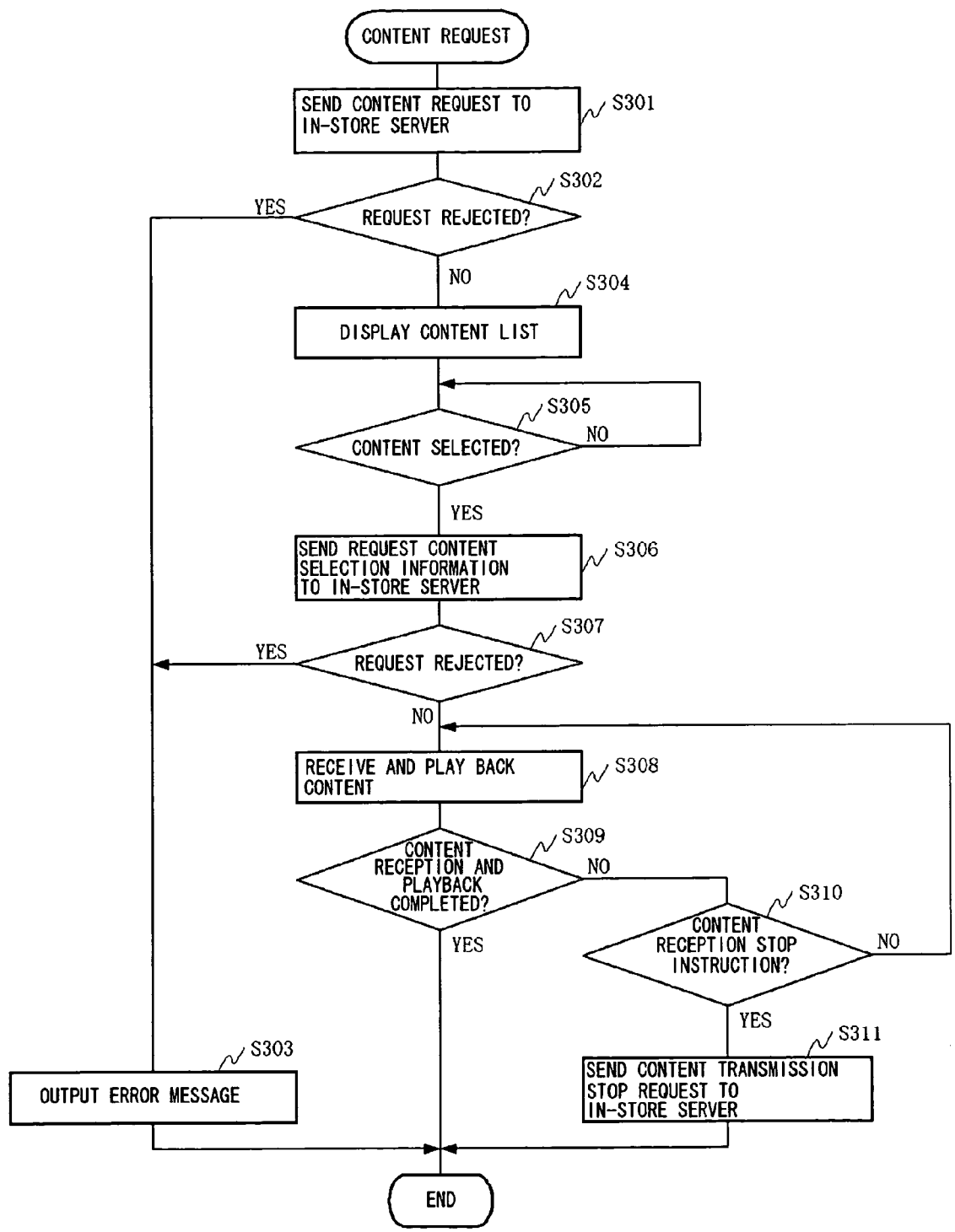
FIG. 5 is a flowchart showing an example of processing of a content request unit of the portable terminal.
Figure 6:
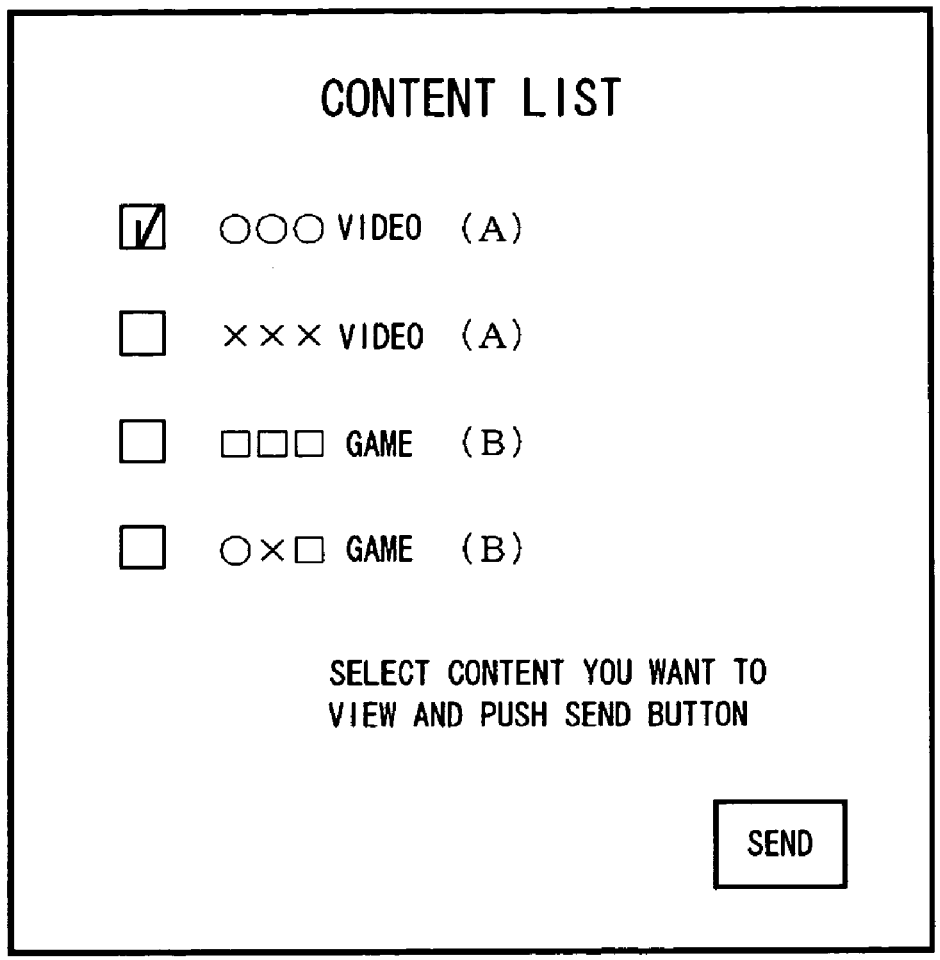
FIG. 6 is a diagram showing an example of a content list screen.

FIG. 5 is a flowchart showing an example of processing executed by the content request unit 312 of the portable terminal 3. When a user of the portable terminal 3 issues a request to acquire a content from the in-store server 1 through the operation of the input/output unit 32, the content request unit 312 uses the communication unit 33 to send a content request, for which the terminal ID of the portable terminal 3 is specified, to the in-store server 1 via the wireless LAN 7 (S301). If this content request is rejected by the in-store server 1 (YES in S302), the content request unit 312 outputs a message on the input/output unit 32 to indicate that the request was rejected (S303) and terminates processing. If the content request is accepted and a content list is sent from the in-store server 1 via the wireless LAN 7 (NO in S302), the content request unit 312 displays the received content list on the input/output unit 32 to present it to the user (S304) and waits for the user to select a content (S305). FIG. 6 shows an example of the content list screen. In this example, four contents are presented, each with a selection box, to request the user to select a desired content and push the send button. In the example in FIG. 6, the symbol A is attached to a use-time limited content, and the symbol B to a use-count limited content, to allow the user to identify the type of each content.

When the user of the portable terminal 3 selects content and pushes the send button, the content request unit 312 sends content selection information, which indicates the selected content, to the in-store server 1 via the wireless LAN 7 (S306). If a rejection message is received from the in-store server 1 in response to the content selection information (YES in S307), the content request unit 312 outputs a message on the input/output unit 32 to indicate that the request was rejected (S303) and terminates processing. By contrast, if the request for the selected content is accepted and the content is sent from the in-store server 1 via the wireless LAN 7 (NO in S307), the content request unit 312 receives the content and plays it back on the input/output unit 32 (S308). The reception and playback of the content is terminated when all the content is received and played back (YES in S309) or when the user enters a content reception stop instruction from the input/output unit 32 (YES in S310), whichever is earlier. If the reception of the content is stopped by a stop instruction entered by the user during the reception of the content (YES in S310), the content request unit 312 sends the content transmission stop request to the in-store server 1 (S311). For a use-time limited content, the content request unit 312 subtracts the length of the viewing time from the maximum use time 215 included in the content usage right data 212 stored in the storage unit 35 and, for a use-count limited content, subtracts 1 count from the maximum use count 216, to inform the user of the remaining use time or use count.

The in-store server 1 is a server that provides the content delivery service to the portable terminal 3 of a customer, who visits the store 5, under a predetermined condition. This server comprises a control unit 11 including the CPU; and communication units 12, 13, and 14 and a storage unit 15, connected to the control unit 11 respectively. The communication unit 12 is means for communication with the content usage right issuing terminal 2 via the communication line 6. The communication unit 13 is means for communication with a portable terminal 3 in the store 5 via the wireless LAN 7. The portable terminal 3 cannot perform communication outside the store 5 because the communication area covered by the wireless LAN 7 covers inside of the store 5. The communication unit 14 is means for wired or wireless communication with the content server 4 via the network 9. The storage unit 15 is a unit such as a magnetic disk drive in which programs and data necessary for processing executed by the control unit 11 are stored. The control unit 11 comprises a usage right registration unit 111 that registers content usage right data, sent from the content usage right issuing terminal 2, with its own server; a connection processing unit 112 that establishes a connection with a portable terminal 3, which has a content usage right, via the wireless LAN 7; a content delivery unit 113 that sends a content to a portable terminal 3 that has a content usage right; and an out-of-area movement detection unit 114 that detects if a portable terminal 3 with a content usage right has left the store 5 and invalidates the content usage right of a portable terminal 3 that has left the store 5.

Figure 7:
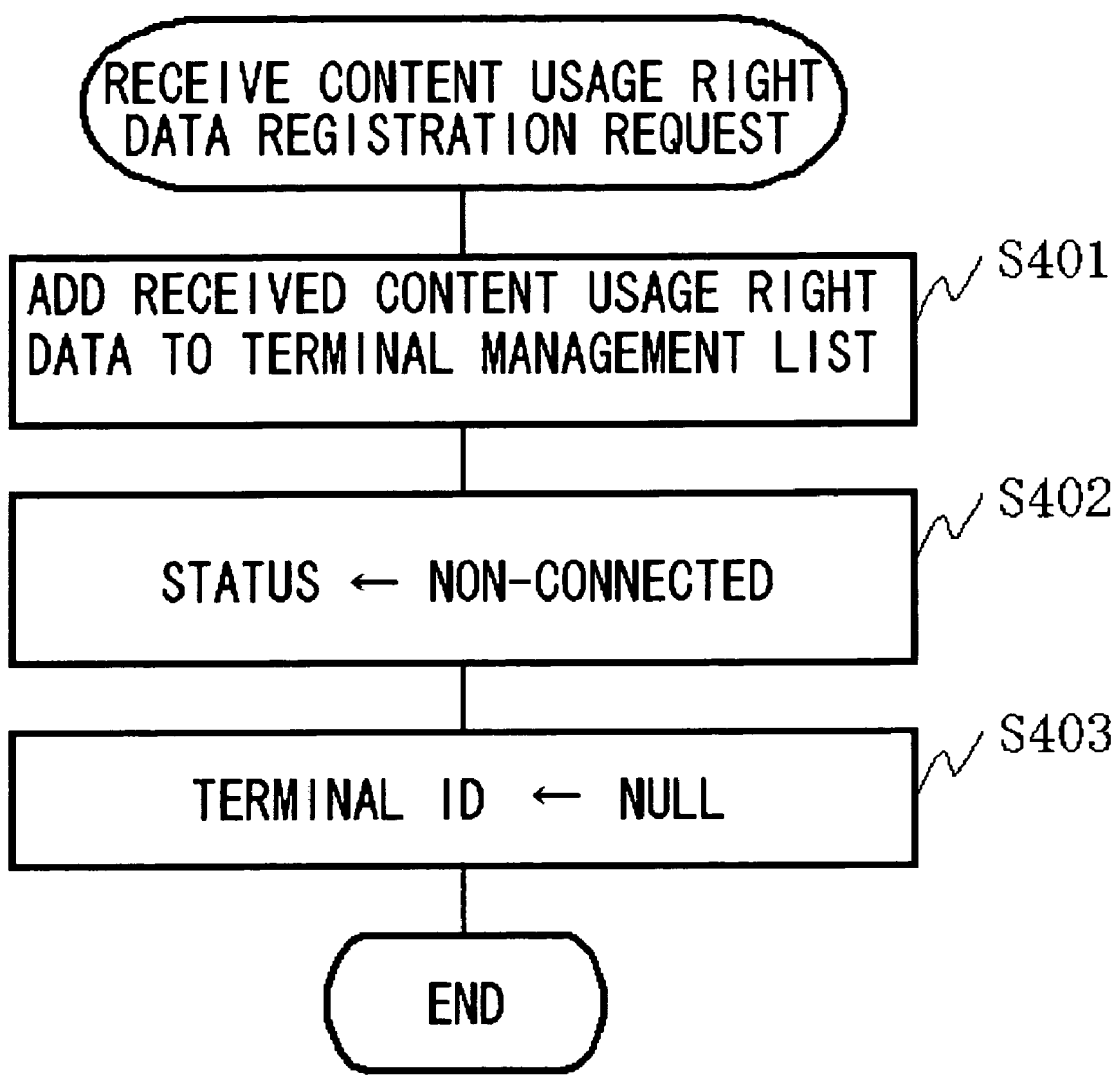
FIG. 7 is a flowchart showing an example of processing of a usage right registration unit of an in-store server.
Figure 8:
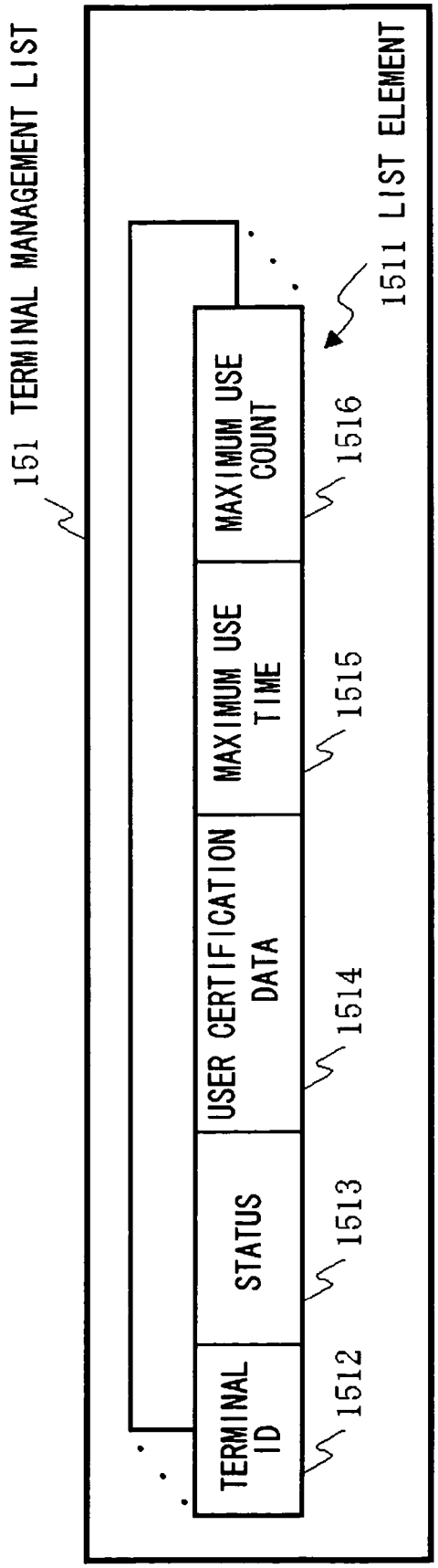
FIG. 8 is a diagram showing an example of a terminal management list.

FIG. 7 is a flowchart showing an example of processing executed by the usage right registration unit 111 of the in-store server 1. When the communication unit 12 receives a content usage right registration request from the content usage right issuing terminal 2 via the communication line 6, the usage right registration unit 111 registers the received content usage right data 212 with a terminal management list 151 in the storage unit 15 (S401). FIG. 8 shows an example of the terminal management list 151. One list element 1511 is composed of the following items: a terminal ID 1512, a status 1513, user certification data 1514, a maximum use time 1515, and a maximum use count 1516. When content usage right data 212 is received, one list element 1511 is added and the user certification data 214, maximum use time 215, and maximum use count 216 included in the received content usage right data 212 are set in the user certification data 1514, maximum use time 1515, and maximum use count 1516 which are items of the added list element, respectively. Next, the usage right registration unit 111 sets "non-connected" in the status 1513 (S402) but leaves the terminal ID 1512 NULL (S403).

Figure 9:
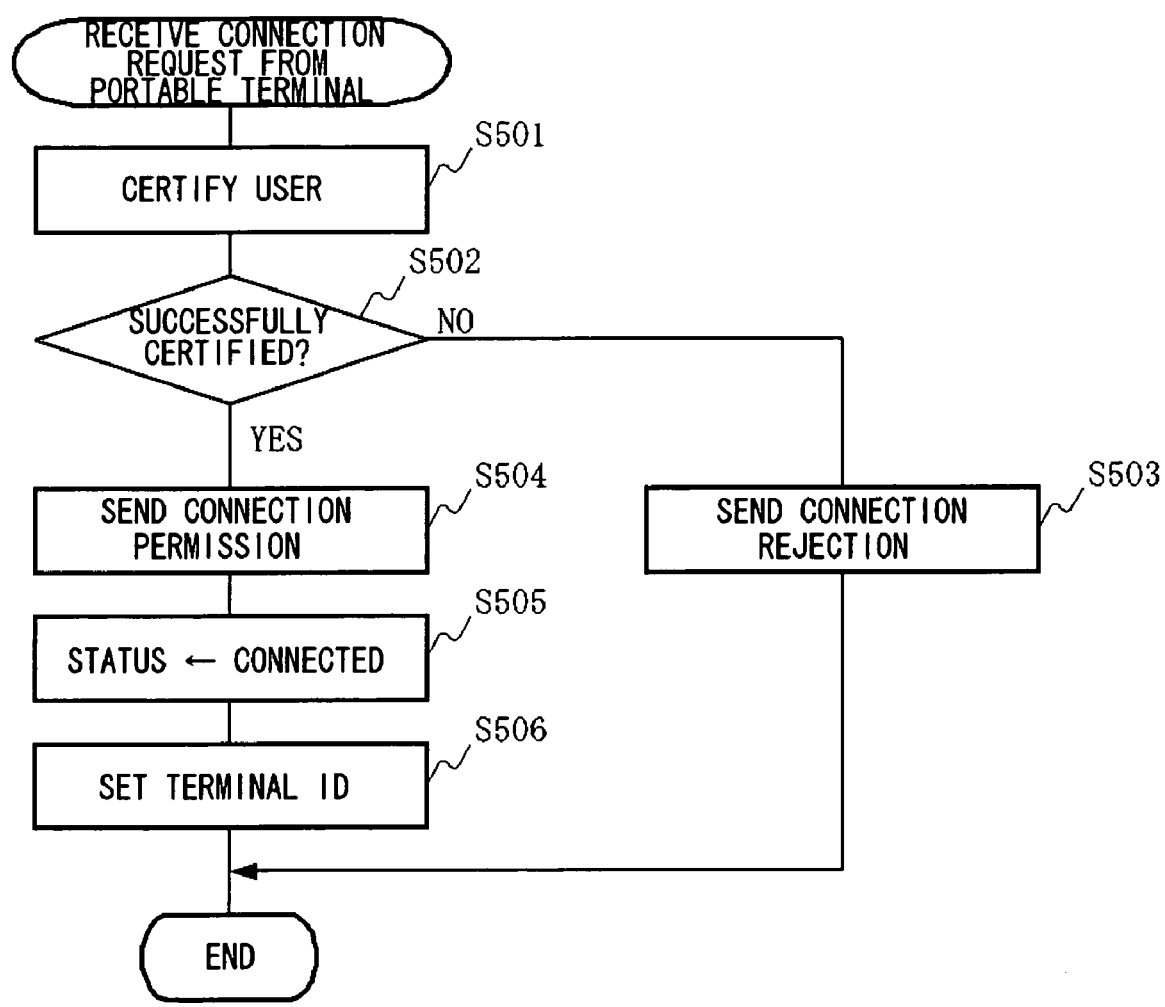
FIG. 9 is a flowchart showing an example of processing of a connection processing unit of the in-store server.

FIG. 9 is a flowchart showing an example of processing executed by the connection processing unit 112 of the in-store server 1. When the communication unit 13 receives a connection request, for which user certification data and a terminal ID are specified, from the portable terminal 3 via the wireless LAN 7, the connection processing unit 112 executes the user certification process (S501). To certify the user in this embodiment, the connection processing unit 112 searches the terminal management list 151 for a list element 1511 that includes user certification data matching the user certification data specified by the connection request. If the search is successful, it is judged that the certification has succeeded; if the search is unsuccessful, it is judged that the certification has failed. If the certification has failed (NO in S502), the connection processing unit 112 sends a message to the portable terminal 3, from which the connection request was received, to indicate that the connection was rejected (S503). If the certification has succeeded (YES in S502), the connection processing unit 112 sends a message to the portable terminal 3, from which the connection request was received, to indicate that the connection is permitted and holds connection with the portable terminal 3 via the wireless LAN 7 (S504). The connection processing unit 112 changes the status 1513 in the list element 1511, which was searched as described above, to "Connected" (S505) and sets the terminal ID of the portable terminal 3, specified by the connection request, in the terminal ID 1512 (S506).

Figure 10:
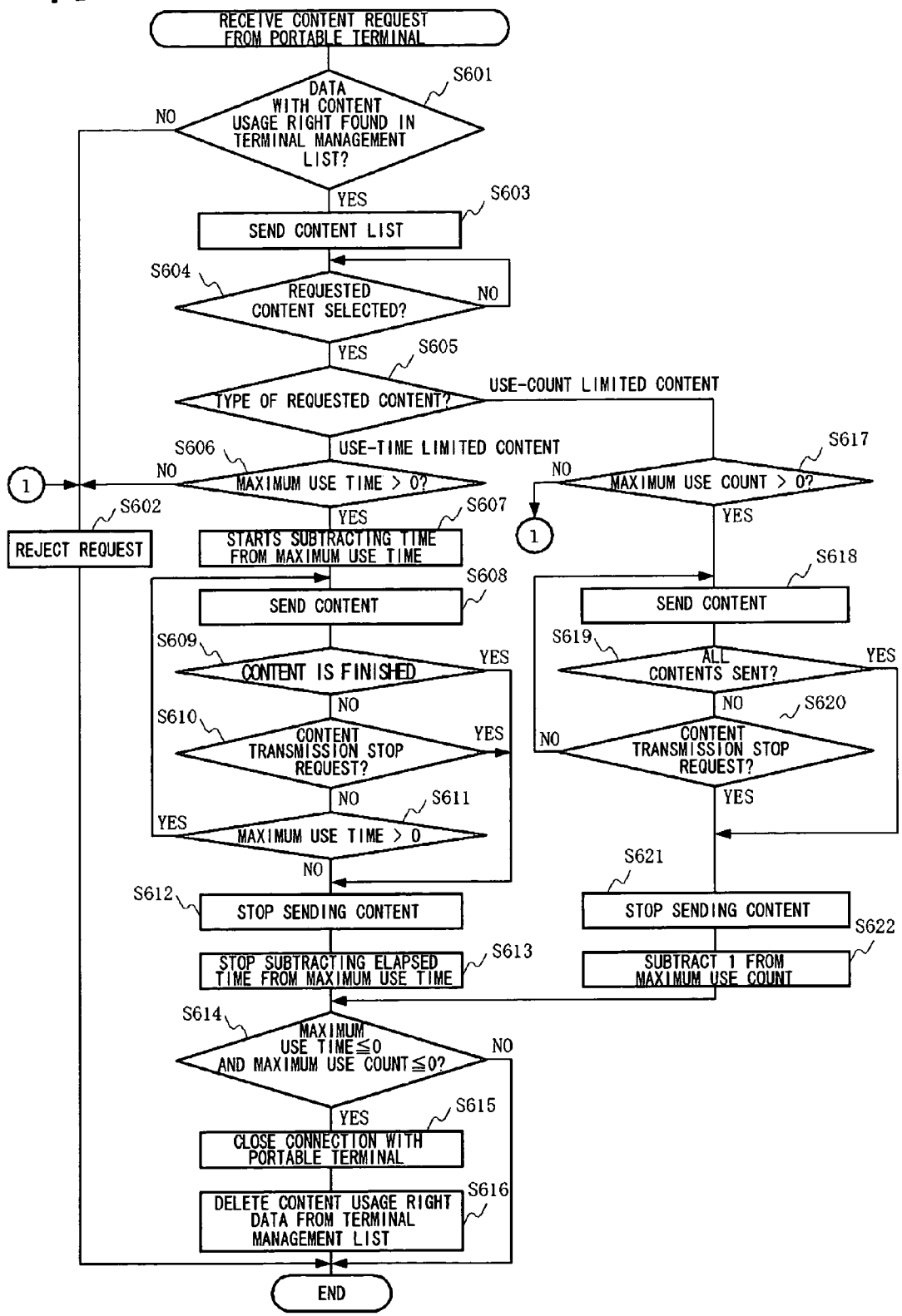
FIG. 10 is a flowchart showing an example of processing of a content delivery unit of the in-store server.

FIG. 10 is a flowchart showing an example of processing executed by the content delivery unit 113 of the in-store server 1. When the communication unit 13 receives a content request, for which a terminal ID is specified, from the portable terminal 3 via the wireless LAN 7, the content delivery unit 113 searches the terminal management list 151 for a list element 1511 that includes a terminal ID matching the terminal ID specified by the content request and judges if the request is sent from a portable terminal 3 having a content usage right (S601). If a list element 1511 matching the terminal ID specified by the content request is not found in the terminal management list 151 (NO in S601), the content delivery unit 113 sends a message to the portable terminal 3, from which the content request was received, to indicate that the request was rejected (S602) and terminates processing. If the corresponding list element 1511 is found in the terminal management list 151 (YES in S601), the content delivery unit 113 sends the content list, such as the one described in FIG. 6, to the portable terminal 3, from which the content request was received, via the wireless LAN 7 (S603) and waits for requested-content selection information to be sent from the portable terminal 3 (S604). When the content selection information is received from the portable terminal 3, the content delivery unit 113 judges if the requested content is a use-time limited content or a use-count limited content (S605) and passes control to each processing step.

When a use-time limited content is requested by the portable terminal 3, the content delivery unit 113 checks if the maximum use time 1515 in the list element 1511 searched for in step S601 is higher than 0, that is, if the use time is not exhausted (S606). If the use time is exhausted, the content delivery unit 113 sends a message to the portable terminal 3, from which the request was received, to indicate that the request was rejected (S602) and terminates processing. If the use time remained, the content delivery unit 113 starts subtracting an elapsed time from the maximum use time 1515 (S607) and starts sending the requested content to the portable terminal 3 (S608). In this embodiment, contents are held, not in the in-store server 1, but in the external content server 4. Therefore, the content delivery unit 113 uses the communication unit 14 to request the content server 4, via the network 9, to send the corresponding content and relays the content, received from the content server 4, to the portable terminal 3 via the wireless LAN 7 to deliver the content to it.

When it is finished to send the requested content fully (YES in S609), the content delivery unit 113 causes the content server 4 to stop sending contents and stops sending contents from itself to the portable terminal 3 (S612). If a content transmission stop request is received from the portable terminal 3 during transmission (YES in S610), the content delivery unit 113 also causes the content server 4 to stop sending contents and stops sending contents from itself to the portable terminal 3 (S612). In addition, when the maximum use time 1515 reaches 0, that is, the use time is exhausted, during transmission (NO in S611), the content delivery unit 113 causes the content server 4 to stop sending content and stops sending content from itself to the portable terminal 3 (S612).

When content transmission is stopped, the content delivery unit 113 stops subtracting an elapsed time from the maximum use time 1515 (S613). The content delivery unit 113 checks if the maximum use time 1515 is equal to or lower than 0 and if the maximum use count 1516 is equal to or lower than 0 (S614). If at least one of the maximum use time 1515 and maximum use count 1516 is higher than 0 (NO in S614), the content delivery unit 113 terminates processing. However, if both are equal to or lower than 0 (YES in S614), the content delivery unit 113 closes the connection with the portable terminal 3 (S615), with which the connection has been established via the wireless LAN 7, and deletes the list element 1511 whose maximum use time 1515 and maximum use count 1516 are equal to or lower than 0 from the terminal management list 151 (S616).

On the other hand, when a use-count limited content is requested by the portable terminal 3, the content delivery unit 113 checks if the maximum use count 1516 in the list element 1511 searched for in step S601 is higher than 0, that is, if the use count is not exhausted (S617). If the use count is exhausted, the content delivery unit 113 sends a message to the portable terminal 3, from which the request was received, to indicate that the request was rejected (S602) and terminates processing. If the use count remained, the content delivery unit 113 starts acquiring the requested content from the content server 4 to send it to the portable terminal 3 (S618). When it is finished to send the requested content fully (YES in S619), the content delivery unit 113 causes the content server 4 to stop sending contents and stops sending contents from itself to the portable terminal 3 (S621). If a content transmission stop request is received from the portable terminal 3 during transmission (YES in S620), the content delivery unit 113 also causes the content server 4 to stop sending contents and stops sending contents from itself to the portable terminal 3 (S621).

When content transmission is stopped, the content delivery unit 113 subtracts 1 from the maximum use count 1516 (S622). The content delivery unit 113 checks if the maximum use time 1515 is equal to or lower than 0 and if the maximum use count 1516 is equal to or lower than 0 (S614). If at least one of the maximum use time 1515 and the maximum use count 1516 is higher than 0 (NO in S614), the content delivery unit 113 terminates processing. However, if both are equal to or lower than 0 (YES in S614), the content delivery unit 113 breaks the connection with the portable terminal 3 (S615), with which the connection has been established via the wireless LAN 7, and deletes the list element 1511 whose maximum use time 1515 and maximum use count 1516 are equal to or lower than 0 from the terminal management list 151 (S616).

Figure 11:
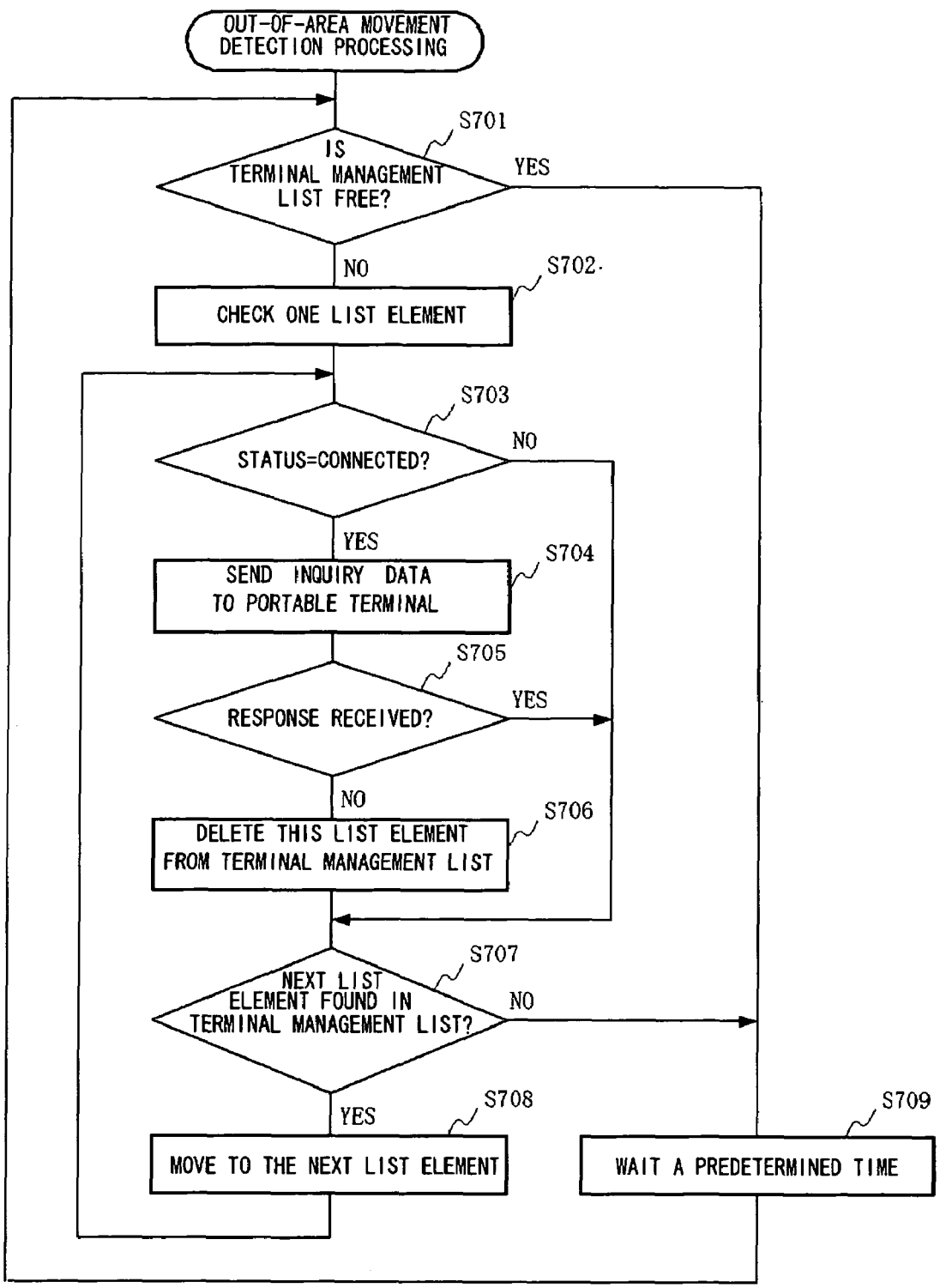
FIG. 11 is a flowchart showing an example of processing of an out-of-area movement detection unit of the in-store server.

FIG. 11 is a flowchart showing an example of processing executed by the out-of-area movement detection unit 114 of the in-store server 1. The out-of-area movement detection unit 114 always executes the processing shown in FIG. 11 during the operation of the in-store server 1. First, the out-of-area movement detection unit 114 checks if the terminal management list 151 is empty (S701) and, if the list includes one or more list elements 1511 (NO in S701), executes steps S702-S708 repeatedly for all existing list elements. If the terminal management list 151 is empty (YES in S701), the out-of-area movement detection unit 114 waits a predetermined time (for example, several scores of seconds to several minutes) (S709) and returns control to step S701 to check if the terminal management list 151 is empty.

If the terminal management list 151 includes one or more list elements 1511, the out-of-area movement detection unit 114 checks the first list element 1511 in the list (S702) to see if the status 1513 is "connected" (S703). If the status is "connected", the out-of-area movement detection unit 114 sends inquiry data to the portable terminal 3, identified by the terminal ID 1512, to request it to return a response via the wireless LAN 7 (S704). If no response is returned in response to this inquiry data within a predetermined time (NO in S705), the out-of-area movement detection unit 114 judges that the portable terminal 3 has left the store 5 and deletes this list element 1511 from the terminal management list 151 to invalidate the content usage right (S706). Then, control is passed to step S707. If it is judged in step S703 that the status 1513 is "non-connected" (NO in S703), the processing of steps S704-S706 is skipped and control is passed to step S707. If a response is received from the portable terminal 3 within a predetermined time in step S705 (YES in S705), step S706 is skipped and control is passed to step S707. It is practicable to prevent a detection error generated, that the inquiry data is sent repeatedly at intervals up to a predetermined number of times until a response is returned from the portable terminal 3 in step S704, and that the portable terminal 3 is judged that it has left the store 5 when no response is returned in response to the inquiry data that has been sent a predetermined number of times repeatedly in step S705. Because the portable terminal 3, which is actually in the store 5, may misjudged that it has left the store 5 due to a reception error of the inquiry data or the response data. And above modification is practicable to prevent the portable terminal 3, which temporarily leaves the store 5 only for a short time, from being judged that it has left the store.

In step S707, the out-of-area movement detection unit 114 checks if there is the next list element 1511 in the terminal management list 151. If such an element is present, the out-of-area movement detection unit 114 moves to the next list element 1511 (S708) and returns control to step S703 to repeat the same processing as the one described above for this list element 1511. If there is no next list element 1511 (NO in S707), the out-of-area movement detection unit 114 waits a predetermined time (S709) and returns control to step S701 to judge if the terminal management list 151 is empty.

The content server 4, an external server holding contents associated with the content delivery service executed by the in-store server 1, comprises a control unit 41 including the CPU; and a communication unit 42 and a storage unit 43, connected to the control unit 41 respectively. The communication unit 42 is means for connection with the in-store server 1 via the network 9. The storage unit 43 is a unit such as a magnetic disk drive in which programs and data necessary for the processing executed by the control unit 41 are stored. The control unit 41 also has a content delivery unit 411 that sends content, requested by the in-store server 1, to the in-store server 1 via the network 9.

The content delivered by the content delivery unit 411 to the in-store server 1 is stored in the storage unit 43 as content 431. Those contents 431 are publicized (delivered) only to predetermined in-store servers.

Next, the operation of this embodiment will be described.

Figure 12:
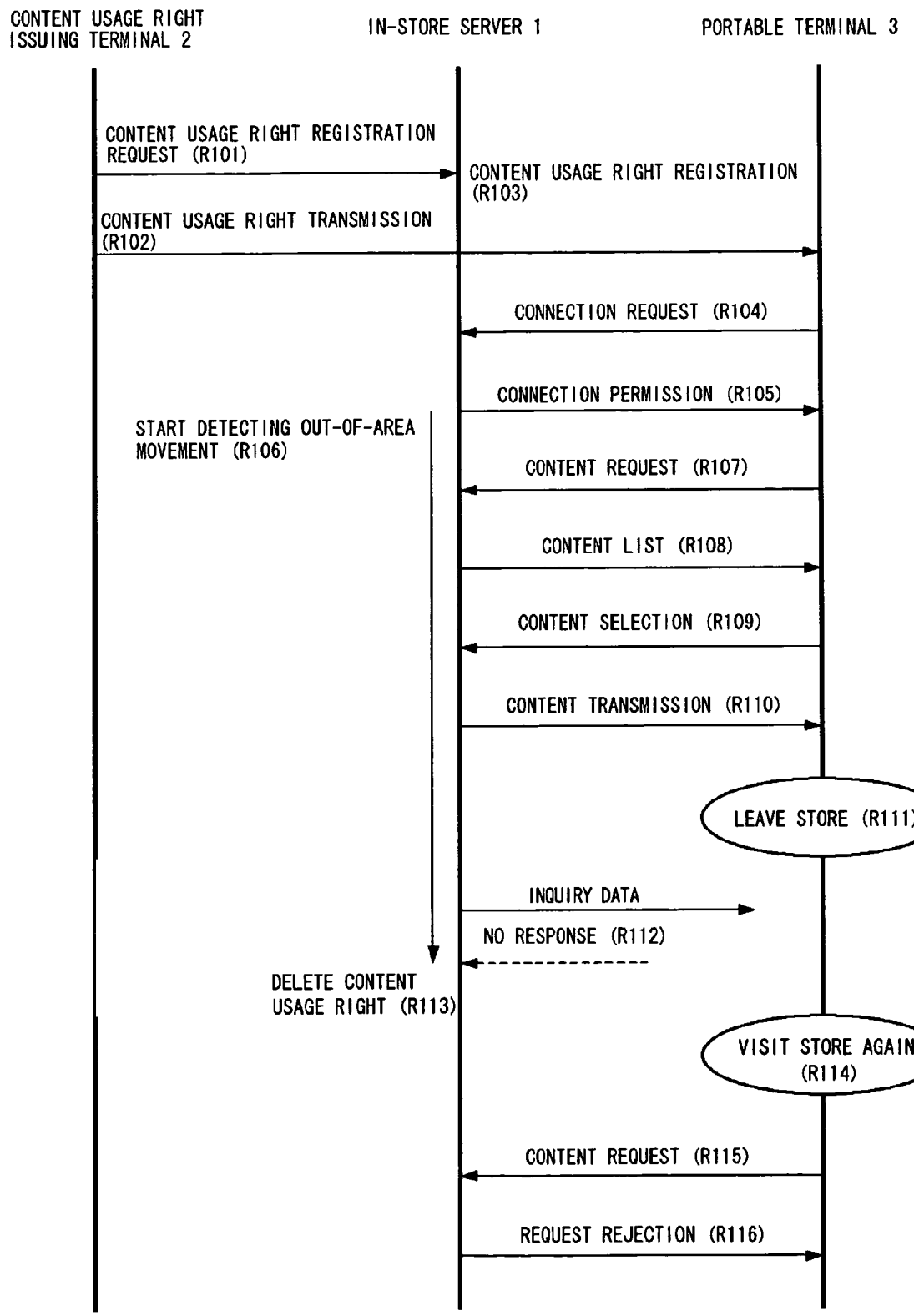
FIG. 12 is a sequence chart showing an example of operation in the first embodiment of the present invention.

FIG. 12 is a sequence chart showing an example of operation of this embodiment. In the system in this embodiment, a user visiting the store 5, who has bought products sold in the store 5 or has used services provided in the store 5, is able to use the content delivery service provided by the store 5 using the portable terminal 3. When a salesperson of the store 5 issues a content usage right from the content usage right issuing terminal 2, the usage right issuing unit 211 of the content usage right issuing terminal 2 generates the content usage right data 212 such as the one shown in FIG. 2 (S101 in FIG. 3), sends to the in-store server 1 a registration request to which the content usage right data 212 is attached (R101 in FIG. 12, S102 in FIG. 3), and sends the content usage right data 212 to the portable terminal 3 (R102 in FIG. 12, S103 in FIG. 3).

The usage right registration unit 111 of the in-store server 1 sets the user certification data 214, maximum use time 215, and maximum use count 216 included in the content usage right data 212, requested to register by the content usage right issuing terminal 2, in the list element 1511 and registers the element with the terminal management list 151 (R103 in FIG. 12, S401 in FIG. 7). Here, it is assumed that the status 1513 of the list element 1511 is "non-connected" and the terminal ID 1512 is NULL (S402 and S403 in FIG. 7).

On the other hand, the portable terminal 3 uses the registration connection unit 311 to store the content usage right data 212, received from the content usage right issuing terminal 2, in the storage unit 35 (S201 in FIG. 4), and sends a connection request, for which the user certification data 214 and the terminal ID of this terminal 3 included in the content usage right data 212 are specified, to the in-store server 1 via the wireless LAN 7 (R104 in FIG. 12, S202 in FIG. 4). The in-store server 1 uses the connection processing unit 112 to certify the user by checking if the user certification data specified by the connection request matches the user certification data that is set in any of the list elements in the terminal management list 151 (S501 in FIG. 9). If the certification succeeds, the in-store server 1 notifies the portable terminal 3 of a connection permission (R105 in FIG. 12, S504 in FIG. 9) and puts the portable terminal 3 in the status that the terminal gets connected via the wireless LAN 7. At this time, the status 1513 of the list element 1511 held in the terminal management list 151 is changed to "connected", and the terminal ID of the portable terminal 3 specified by the connection request is set in the terminal ID 1512. Because the status 1513 is changed to "connected", the out-of-area movement detection unit 114 of the in-store server 1 starts sending inquiry data regularly to the portable terminal 3 via the wireless LAN 7 to check if the portable terminal 3 has left the store 5 (see R106 in FIG. 12 and FIG. 11).

Thereafter, in the sequence chart in FIG. 12, the content request unit 312 of the portable terminal 3 issues a content request to the in-store server 1 (R107, S306 in FIG. 5) and, in response to this request, the content delivery unit 113 of the in-store server 1 sends a content list, such as the one shown in FIG. 6, to the portable terminal 3 (R108, S603 in FIG. 10). Also, the content request unit 312 of the portable terminal 3 sends content selection information back to the in-store server 1 (R109, S306 in FIG. 5). Because the maximum use time 1515 includes sufficient time and the maximum use count 1516 includes a sufficient number of times, the content delivery unit 113 acquires the requested content from the content server 4 and sends it to the portable terminal 3 (R110, S608 and S618 in FIG. 10).

The user can receive the delivery of contents from the in-store server 1 until both the maximum use time 215 and the maximum use count 216 in the content usage right data 212 issued to the portable terminal 3 reach zero. In the sequence chart shown in FIG. 12, it is assumed that the user carrying the portable terminal 3 leaves the store 5 when the use time and the use count are not yet exhausted (R111). Because inquiry data sent, via the wireless LAN 7, from the out-of-area movement detection unit 114 of the in-store server 1 in the store 5 cannot reach the portable terminal 3 when the user has left the store 5, no response to the inquiry data is returned from the portable terminal 3 (R112). Therefore, the out-of-area movement detection unit 114 deletes the list element 1511 having the terminal ID of the portable terminal 3 from the terminal management list 151 to invalidate the content usage right issued to the portable terminal 3 (R113, S706 in FIG. 11). Therefore, even if the user carrying the portable terminal 3 enters the store 5 later (R114) to request a content (R115), the request is rejected because the content usage right issued to the portable terminal 3 is no longer registered with the terminal management list 151 (R116).

As described above, this embodiment can provide a user, who visits a store, with the content delivery service until a predetermined time and a predetermined count specified for the content usage right have exhausted. At the same time, even if the use time and the use count have not yet exhausted, this embodiment invalidates the content usage right once the user who visits the store leaves the store 5. Although both the maximum use time and the maximum use count are used as the use condition in this embodiment, it is possible that the use condition is established by only one of them or that the use condition such as the use time and the use count is not established. Although a portable terminal 3, to which a content usage right is issued, automatically issues a connection request to the in-store server 1, the connection request may also be issued after an instruction is received from the user of the portable terminal 3. In addition, although contents to be delivered by the in-store server 1 are stored in the external content server 4 and the in-store server 1 relays and delivers contents to the portable terminal 3, it is also possible that the in-store server 1 stores contents. Furthermore, although a content usage right is invalidated by deleting the corresponding content usage right data from the terminal management list 151, the content usage right data need not be deleted but an invalidation mark may be attached to it or both maximum use time and the maximum use count may set 0 to virtually invalidate the content usage right.

Second Embodiment

Figure 13:
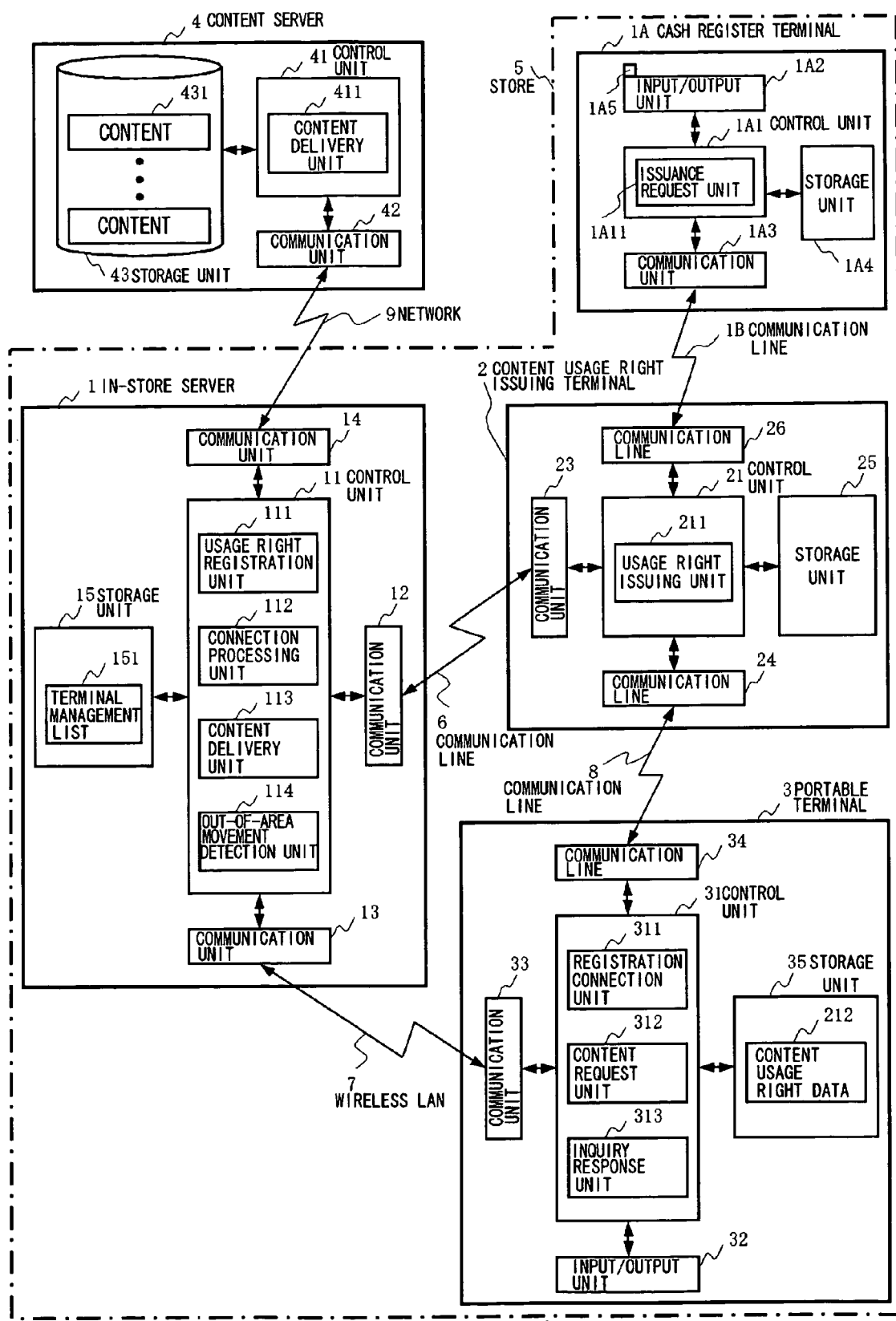
FIG. 13 is a block diagram showing an area-based content delivery system in a second embodiment of the present invention.

Referring to FIG. 13, an area-based content delivery system in a second embodiment of the present invention, which has a cash register terminal 1A connected to a content usage right issuing terminal 2 through a communication line 1B, differs from the area-based content delivery system in the first embodiment in FIG. 1 in that, when the content usage right issuing terminal 2 issues a content usage right to a portable terminal 3, the operation of the cash register terminal 1A is involved.

The cash register terminal 1A, with a normal cash register terminal function for registering transactions such as the payment of purchased products as well as a function for issuing a content usage right to the content usage right issuing terminal 2, comprises a control unit 1A1 which includes the CPU; and an input/output unit 1A2, a communication unit 1A3, and a storage unit 1A4, connected to the control unit 1A1 respectively. The input/output unit 1A2 has a keyboard and a scanner, usually provided on a normal cash register terminal, as well as a content usage right issuing request button 1A5. The communication unit 1A3 is means for wired or wireless communication with the content usage right issuing terminal 2 via the communication line 1B. The storage unit 1A4 is a unit such as a magnetic disk drive in which programs and data necessary for the processing of the control unit 1A1 are stored. The control unit 1A1 has an issuance request unit 1A11 that uses a communication unit 1A3 to send a content usage right issuing request to the content usage right issuing terminal 2 via the communication line 1B when the content usage right issuing request button is pressed.

Figure 14:
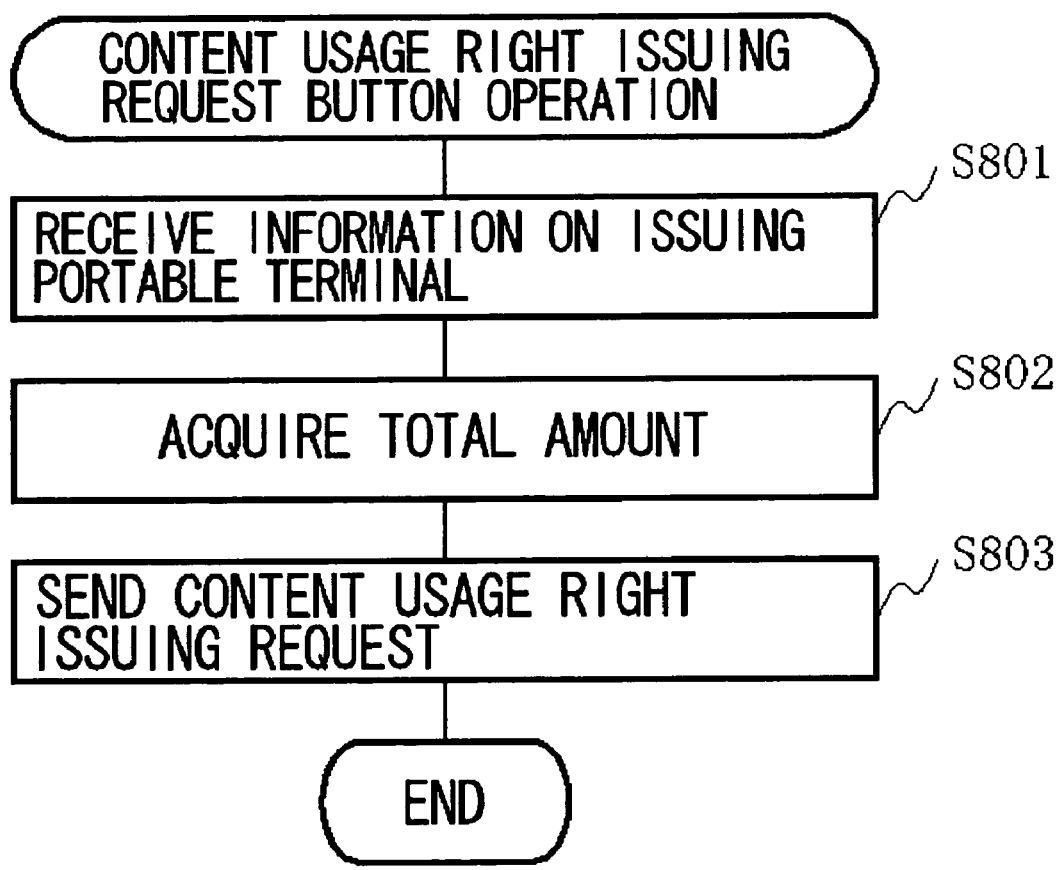
FIG. 14 is a flowchart showing an example of processing of an issuance request unit of a cash register terminal.

FIG. 14 is a flowchart showing an example of processing executed by the issuance request unit 1A11 of the cash register terminal 1A. When a salesperson at the cash register terminal requests a customer to pay for products purchased in a store 5 or for the services provided in the store 5, the salesperson presses a content usage right issuing request button 1A5 when the total is calculated. Then, the issuance request unit 1A11 receives information, required by the content usage right issuing terminal 2 to send a content usage right to the portable terminal 3 such as the address of the portable terminal 3, from the input/output unit 1A2 (S801) and acquires a total amount calculated and held in the cash register terminal 1A (S802). The cash register terminal 1A then sends a content usage right issuing request, for which information on the portable terminal 3 and the total amount are specified, to the content usage right issuing terminal 2 via the communication line 1B (S803).

Figure 15:
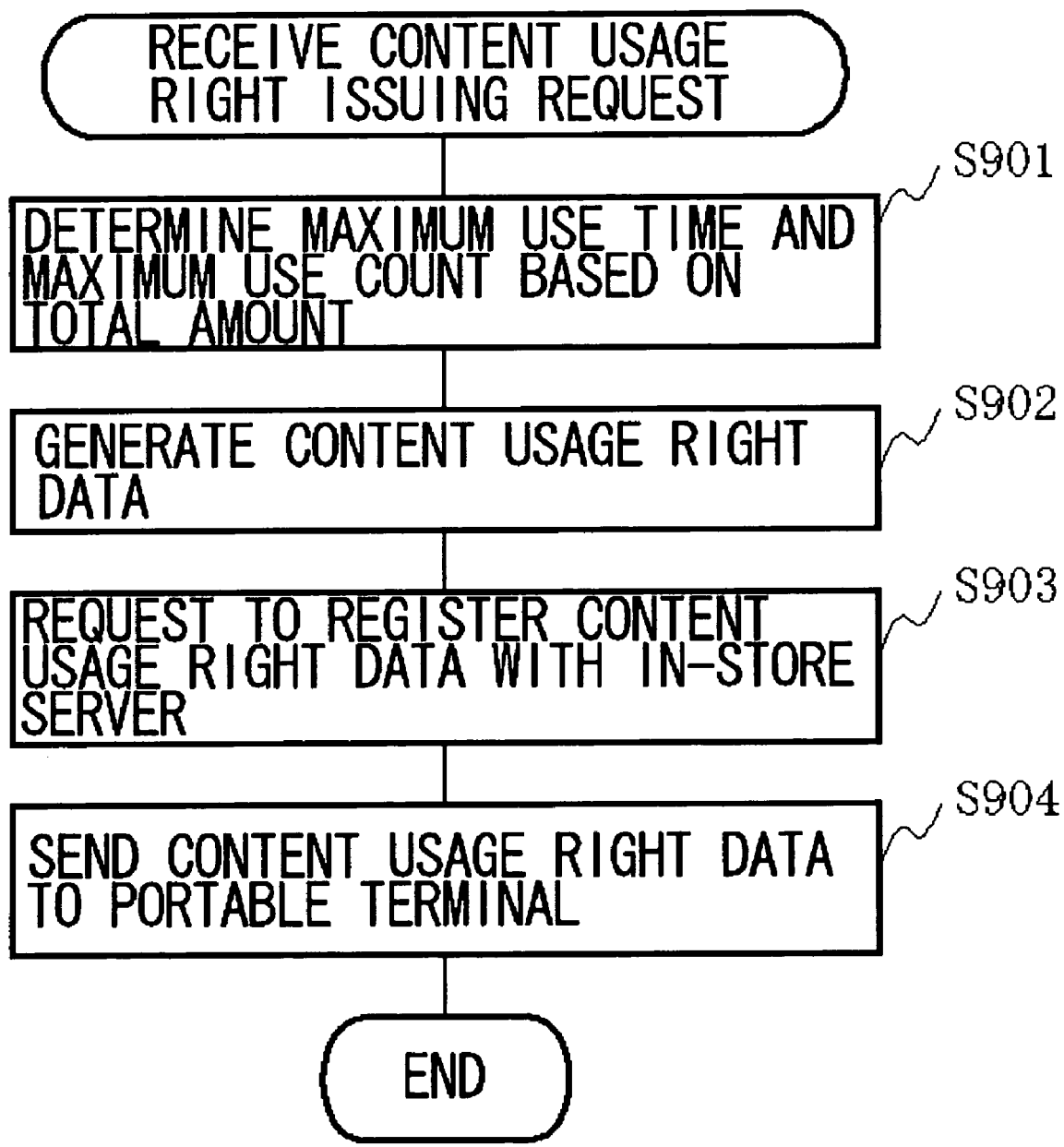
FIG. 15 is a flowchart showing an example of processing of a usage right issuing unit of a content usage right issuing terminal.

The content usage right issuing terminal 2 has a communication unit 26 for communication with the cash register terminal 1A. Unlike the usage right issuing unit 211 in FIG. 1, a usage right issuing unit 211 in this embodiment issues a content usage right when the communication unit 26 receives the content usage right issuing request from the cash register terminal 1A. FIG. 15 shows an example of processing executed by the usage right issuing unit 211. In response to a content usage right issuing request, the usage right issuing unit 211 first determines the maximum use time and the maximum use count based on the total amount specified by the request (S901). For example, if the total amount is under ¥1,000, then the maximum use time=20 minutes and the maximum use count=1; if the total amount is equal to or higher than ¥1,000 and lower than ¥2,000, then the maximum use time=40 minutes and maximum use count=2; and if the total mount is equal to or higher than ¥2,000, then the maximum use time is 60 minutes and the maximum use count is 3. Of course, this is only exemplary, and any maximum use time and maximum use count may be defined according to the total amount. Next, the usage right issuing unit 211 generates unique user certification data and adds pre-set available server information 213 and the maximum use time and the maximum use count, determined as described above, to the generated certification data to generate content usage right data 212 such as the one shown in FIG. 2 (S902). As in the embodiment in FIG. 1, a usage right registration request to which the generated content usage right data 212 is attached is sent to the in-store server 1 (S903), and the generated content usage right data 212 is sent to the portable terminal 3 (S904).

Except for the configuration and the operation described above, the second embodiment is similar to the first embodiment shown in FIG. 1.

As described above, because the issuance of a content usage right from the content usage right issuing terminal 2 can be controlled through the operation on the cash register terminal 1A in the store 5 in this embodiment, the number of operators on the content usage right issuing terminal 2 can be reduced and therefore the personnel can be reduced. In addition, a content usage right can be reliably issued only to users who have bought products in the store 5. Furthermore, the use condition can be automatically changed flexibly according to the total amount of purchased products. It should be noted that the present invention is also applicable to a case where it is not desired to apply a use condition according to the total amount each customer has bought.

Third Embodiment

Figure 16:
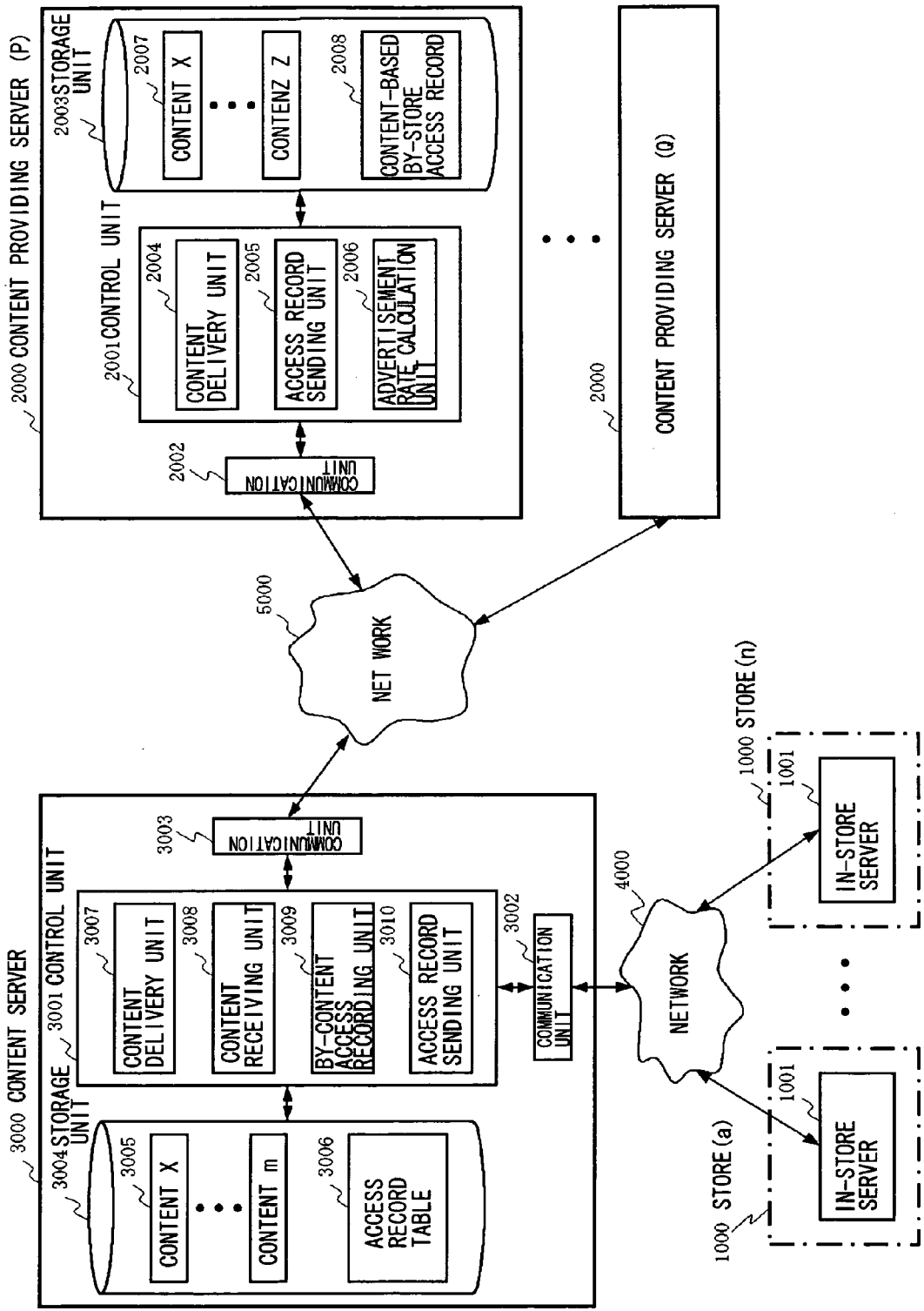
FIG. 16 is a block diagram showing an area-based content delivery system in a third embodiment of the present invention.

Referring to FIG. 16, an area-based content delivery system in a third embodiment of the present invention comprises a plurality of stores 1000, a plurality of content providing servers 2000, and one content server 3000. The content server 3000 is connected to the plurality of stores 1000 via a network 4000 and, at the same time, to the plurality of content providing servers 2000 via a network 5000.

An in-store server 1001, similar to the in-store server 1 described in the first and second embodiments, is installed in each store 1000. Although omitted in the figure, the content usage right issuing terminal 2 and the portable terminal 3 described in the first and second embodiments are provided. The service is carried out in the following way: that is, in response to a request from the portable terminal 3, the in-store server 1001 acquires a content from the content server 3000 based on content usage right data issued from the content usage right issuing terminal 2 and delivers (relays) the content to the portable terminal 3 in the store.

Each of the content providing servers 2000 comprises a control unit 2001 including the CPU; and a communication unit 2002 and a storage unit 2003, connected to the control unit 2001 respectively. The communication unit 2002 is means for communication with the content server 3000 via the network 5000. The storage unit 2003 is a unit such as a magnetic disk drive in which programs and data necessary for the processing of the control unit 2001 are stored. The control unit 2001 comprises a content sending unit 2004 that reads an advertisement-included content 2007 from the storage unit 2003 and sends (delivers) it to the content server 3000; an access record receiving unit 2005 that receives a content-based store-by-store access record 2008 from the content server 3000 and records it in the storage unit 2003; and an advertisement rate calculation unit 2006 that calculates an advertisement rate to be paid to each store 1000 based on the content-based store-by-store access record 2008.

FIG. 17 shows an example of the content-based store-by-store access record 2008 that the content providing server 2000 has received from the content server 3000. The access status of the stores, a-n, is recorded for contents, X-Z, provided to the content server 3000. In this embodiment, the use time is used as the access status of a use-time limited content, and the use count as the status of a use-count limited content. For example, the access record in the first row indicates that content X is used in store "a" a total of 50 times, in store "b" a total of 20 times, and in store "n" a total of 10 times. The access record in the second row indicates that content Y is used in store "a" a total of 10 hours, in store "b" a total of five hours, and in store "n" a total of three hours.

Based on the content-based store-by-store access record 2008 and the basic advertisement rate per hour or per use for each content, the advertisement rate calculation unit 2006 calculates the total of advertisement rates to be paid to each store.

The content server 3000 comprises a control unit 3001 including the CPU; and communication units 3002 and 3003 and a storage unit 3004, connected to the control unit 3001 respectively. The communication unit 3002, corresponding to the communication unit 42 described in the first and second embodiments, is means for communication with the in-store server 1001 of each store 1000 via the network 4000. The communication unit 3003 is means for communication with each content providing server 2000 via the network 5000. The storage unit 3004 is a unit such as a magnetic disk drive in which programs and data necessary for the processing of the control unit 3001 are stored. Contents 3005 provided from each content providing server 2000 and an access record table 3006, used for generating the content-based store-by-store access record 2008, are stored in the storage unit 3004.

FIG. 18 shows an example of the access record table 3006. The table is composed of rows, one for each provided content. Each row is composed of the following items: a content provider 3111, a content 3112, and the identifier of each store 3113. The table includes the items for the store 3113, one for each store.

The control unit 3001 of the content server 3000 comprises a content delivery unit 3007 that delivers a content to the in-store server 1001 of each store 1000; a content receiving unit 3008 that stores a content, provided from the content providing server 2000, in the storage unit 3004 and at the same time adds a row for the content to the access record table 3006; a by-content access recording unit 3009 that updates the access status in the access record table 3006 based on how the content delivery unit 3007 has delivered each content to each store 1000; and an access record sending unit 3010 that creates a content-based store-by-store access record 2008 for each content providing server 2000 by referencing the access record table 3006 at a predetermined time, such as the end of each month, sends the created record to the content providing server 2000, and initializes the access status in the access record table 3006.

Next, the operation of this embodiment will be described.

Each content providing server 2000 uses the content sending unit 2004 to provide a an advertisement-included content 2007 to the content server 3000 via the network 5000. The content server 3000 uses the content receiving unit 3008 to store the provided content 2007 in the storage unit 3004 and adds a row to the access record table 3006 in FIG. 18 to describe the access status. Immediately after this row is added, the access status is all initialized to 0.

After that, when a request for a content that will be delivered from the in-store server 1001 in a store 1000 to a portable terminal is received via the network 4000, the content delivery unit 3007 of the content server 3000 reads the requested content from the storage unit 3004 as in the first and second embodiments and sends it to the requesting in-store server 1001 via the network 4000. If a use-time limited content is sent from the content delivery unit 3007 to the store 1000, the by-content access recording unit 3009 searches the access record table 3006 for a row containing the access status of the content that has been sent and increments the access status (use time) of the corresponding store in that row by the transmission duration. Because the in-store server 1001 relays the content, which is sent from the content server 3000, to the portable terminal as described in the first embodiment, the transmission duration is almost equal to the use time. If a use-count limited content is sent to a store 1000 by the content delivery unit 3007, the by-content access recording unit 3009 searches the access record table 3006 for a row containing the access status of the content that has been sent and increments the access status (use count) of the corresponding store in the row by 1. By executing this processing, the content-based store-by-store access status is recorded in the access record table 3006.

At a predetermined time such as the end of a month, the access record sending unit 3010 of the content server 3000 creates the content-based store-by-store access record 2008 for each content providing server by referencing the access record table 3006 and sends the created record to the content providing server 2000 via the network 5000. Then, access record sending unit 3010 initializes the access record table 3006.

The content providing server 2000, which receives the content-based store-by-store access record 2008 created for the server via the access record receiving unit 2005, uses the advertisement rate calculation unit 2006 to calculate the advertisement rate to be paid to each store and outputs the calculated rate from an output unit not shown. The output advertisement rate for each store is paid to the store 1000 in an ordinary way.

As described above, the content server 3000 generates a store-by-store access record for the advertisement-included contents for each content providing server 2000 and sends the created record to the corresponding content providing server 2000. Therefore, based on the content-based store-by-store access record that has been received, the content providing server 2000 can automatically calculate an advertisement rate to be paid to each store for advertisement-included contents provided by itself. This allows the operator of the content providing server 2000 to pay an advertisement rate to a store 1000, where access is actually made to advertisement-included contents, according to the use status.

Although some embodiments of the present invention have been described above, the present invention is not limited to the embodiments described above but various additions or modifications are possible. For example, in the above embodiments, content usage right data issued by the content usage right issuing terminal is sent to a portable terminal through communication between the content usage right issuing terminal and the portable terminal. It is also possible that the content usage right issuing terminal provides a portable terminal user with content usage right data by printing it on a paper medium so that the user can manually store the content usage right data from the input/output unit of the portable terminal into the storage unit of the portable terminal.

In the above embodiments, content usage right data issued by the content usage right issuing terminal is sent to the content server through communication between the content usage right issuing terminal and the content server. It is also possible that the portable terminal sends content usage right data to the content server, generated for the portable terminal, when a connection request is sent to the content server.

In the above embodiments, the content delivery service is provided free to a user, who has bought products in a store or has used services provided by the store, as one of customer services. The present invention is also applicable when the content delivery service is provided to a user, either free or at a charge, whether the user has bought products or has used services.

The function of the in-store server, portable terminal, content usage right issuing terminal, content server, or content providing server can be implemented not only by hardware components but also by a computer and a program. The program, recorded in a computer readable recording medium such as a magnetic disk or a semiconductor memory, is read into the computer at computer startup time or the like. By controlling the operation of the computer, the computer can function as the in-store server, portable terminal, content usage right issuing terminal, content server, or content providing server described in the embodiments described above.

Although the content transmission area of the in-store server covers inside of (The area is limited to within a store, the content transmission area is not strictly limited to an area within the store but may be an area including the store and the neighboring area of the store.

The meritorious effects of the present invention are summarized as follows.

As described above, the present invention gives the following effect.

Once a user carrying a portable terminal to which the content usage right has been issued leaves the store, the content usage right is invalidated. Therefore, the content delivery service can be provided only to those users who have been staying in the store.

It is possible to automatically detect a portable terminal with the content usage right, which has left the store, and to invalidate the content usage right in the case of that making an in-store server send regularly inquiry data to a portable terminal having the content usage right and detect a non-responding portable terminal as a terminal that has left the store.

The content usage right may include a use condition composed of at least one of the maximum use time and the maximum use count. In this case, even a user who has been staying in a store can receive the content delivery service under the limitation of the use time and the use count.

The issuance of the content usage right from the content usage right issuing terminal can be controlled through the operation of a cash register terminal in a store. In this case, the number of operators of the content usage right issuing terminal may be reduced and, in addition, the content usage right can be reliably issued only to those users who bought products in the store.

A content usage right issuing request generated from a cash register terminal can include a total amount paid by a customer, and the content usage right can be issued with a use condition established according to the total amount. This automatically allows the use condition to be changed flexibly according to the total purchase amount.

An in-store server can acquire content, which is to be sent to a portable terminal, from the content server installed outside the store and send the acquired content to the portable terminal, thus eliminating the need for each in-store server to hold and manage contents. This allows the external content server to hold and manage the contents integrally.

A content providing server can be provided that provides the content server with advertisement-included contents, which will be sent to an in-store server by the content server. The content server can create a content-based store-by-store access record for each content providing server and send it to the corresponding content providing server. The content providing server can calculate an advertisement rate to be paid to each store based on the received content-based store-by-store access record. Therefore, the operator of the content providing server can pay an advertisement rate to each store, where access is actually made to advertisement-included contents, according to the use status.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An area-based content delivery method comprising the steps of:
   (a) issuing, by a content usage right issuing terminal, a content usage right to a portable terminal of a user who visits a store, the content usage right including a maximum elapsed use time;
   (b) in response to a request from the portable terminal having the content usage right, sending a content to the requesting portable terminal by an in-store server whose content transmission area covers inside of the store;
   (c) detecting, by said in-store server, that the portable terminal having the content usage right has left the store and invalidating the content usage right issued to the portable terminal in response to the detection that the portable terminal has left the store; and
   (d) the in-store server subtracting elapsed time from the maximum elapsed use time and closing a connection to the portable terminal in response to a result of the subtracting being that the maximum elapsed use time has been reached.

2. The area-based content delivery method as defined by claim 1 wherein, in said step (c), said in-store server regularly sends inquiry data to the portable terminal having the content usage right and detects that the portable terminal has left the store in response to failure of the portable terminal to reply to the inquiry data.

3. The area-based content delivery method as defined by claim 1 wherein, in said step (a), said content usage right issuing terminal issues the content usage right in response to a content usage right issuing request, for which a total amount paid by a customer is specified, that is received from a cash register terminal, the maximum elapsed use time being determined according to the total amount.

4. The area-based content delivery method as defined by claim 1 wherein, in said step (b), said in-store server acquires the content to be sent to said portable terminal from a content server installed outside the store and sends the content to said portable terminal.

5. An area-based content delivery method comprising the steps of:
   (a) issuing, by a content usage right issuing terminal, a content usage right to a portable terminal of a user who visits a store, the content usage right including a use condition composed of at least one of a maximum use time and a maximum use count;
   (b) in response to a request from the portable terminal having the content usage right, an in-store server whose content transmission area covers inside of the store checks the use condition to determine whether to send a content, acquires the content to be sent to said portable terminal from a content server installed outside the store, and sends the content to the requesting portable terminal;
   (c) detecting, by the in-store server, that the portable terminal having the content usage right has left the store and invalidating the content usage right issued to the portable terminal in response to the detection that the portable terminal has left the store, wherein the content sent by said content server to said in-store server is an advertisement-including content provided by one of a plurality of content providing servers, wherein said content server creates a content-based store-by-store access record for each content providing server and sends the created record to the content providing server, and wherein the content providing server calculates an advertisement rate to be paid to each store based on the received content-based store-by-store access record; and
   (d) paying each store an amount based on the advertising rate.

6. An area-based content delivery system comprising:
   a content usage right issuing terminal that issues a content usage right to a portable terminal of a user who visits a store, the content usage right including a maximum elapsed use time; and
   an in-store server whose content transmission area covers inside of the store and which, in response to a request from the portable terminal having the content usage right, sends a content to the requesting portable terminal,
   wherein said in-store server comprises:
   a detecting unit detecting that the portable terminal having the content usage right has left the store,
   a usage right invalidating unit invalidating the content usage right issued to the portable terminal in response to said detecting unit detecting that the portable terminal has left the store, and
   a content delivery unit subtracting elapsed time from the maximum elapsed use time and closing a connection to the portable terminal in response to a determination that the maximum elapsed use time has been reached.

7. The area-based content delivery system as defined by claim 6 wherein said detecting unit regularly sends inquiry data to the portable terminal having the content usage right and detects that the portable terminal has left the store in response to failure of the portable terminal to reply to the inquiry data.

8. The area-based content delivery system as defined by claim 6 wherein said content usage right issuing terminal issues the content usage right when a content usage right issuing request is received from a cash register terminal.

9. The area-based content delivery system as defined by claim 6 wherein said content usage right issuing terminal issues the content usage right when a content usage right issuing request, for which a total amount paid by a customer is specified, is received from a cash register terminal, said maximum elapsed use time being determined according to the total amount.

10. The area-based content delivery system as defined by claim 6 wherein said in-store server acquires the content to be sent to the portable terminal from a content server installed outside the store and sends the content to said portable terminal.

11. An area-based content delivery system comprising:
    a content usage right issuing terminal that issues a content usage right to a portable terminal of a user who visits a store; and
    an in-store server whose content transmission area covers inside of the store and which, in response to a request from the portable terminal having the content usage right, acquires a content to be sent to the portable terminal from a content server installed outside the store and sends the content to said portable terminal, said in-store server comprising, a detecting unit detecting that the portable terminal having the content usage right has left the store, and a usage right invalidating unit invalidating the content usage right issued to the portable terminal in response to said detecting unit detecting that the portable terminal has left the store, wherein the content sent by said content server to said in-store server is an advertisement-included content provided by one of a plurality of content providing servers, wherein said content server creates a content-based store-by-store access record for each content providing server and sends the created record to the content providing server, and wherein the content providing server calculates an advertisement rate to be paid to each store based on the received content-based store-by-store access record.

12. An in-store server comprising:

a content sending unit whose content transmission area is limited to within a store and which, in response to a request from a portable terminal having a content usage right that includes a maximum elapsed use time, sends a content to the requesting portable terminal;

a detecting unit detecting that the portable terminal having the content usage right has left the store;

a usage right invalidating unit invalidating the content usage right of the portable terminal in response to said detecting unit detecting that the portable terminal has left the store, and a content delivery unit subtracting elapsed time from the maximum elapsed use time and closing a connection to the portable terminal in response to a determination that the maximum elapsed use time has been reached.

13. The in-store server as defined by claim 12 wherein said detecting unit regularly sends inquiry data to the portable terminal having the content usage right and detects that the portable terminal has left the store in response to failure of the portable terminal to reply to the inquiry data.

14. A content server comprising:

a content delivery unit connected to a plurality of in-store servers via a network and delivering a content that is sent from any one of said in-store servers to a portable terminal, to said in-store server, wherein, in response to a request from a portable terminal having a content usage right, said in-store server whose transmission area is limited to within a store sends the content to the requesting terminal, detects that the portable terminal having the content usage right has left the store, and invalidates the content usage right of the portable terminal in response to a detection that the portable terminal has left the store;

an access recording unit monitoring the content delivery status of said content delivery unit and for generating a content-based store-by-store access record;

a content receiving unit receiving the content, which will be delivered to said in-store server, from a content providing server; and an access record sending unit sending the content-based store-by-store access record of contents, which are received from said content providing server, to said content providing server.

15. A program in a computer-readable medium that causes a computer, which constitutes an in-store server, to perform a method comprising the steps of:

providing a content sending unit whose content transmission area is limited to within a store and which, in response to a request from a portable terminal having a content usage right that includes a maximum elapsed use time, sends a content to the requesting portable terminal;

providing a detecting unit which detects that the portable terminal having the content usage right has left the store;

providing a usage right invalidating unit which invalidates the content usage right of the portable terminal that has left the store;

sending a content, in response to a request from a portable terminal to the requesting portable terminal;

detecting that said portable terminal has left the store;

invalidating the content usage right of said portable terminal; and subtracting elapsed time from the maximum elapsed use time and closing a connection to the portable terminal in response to a result of the subtracting being that the maximum elapsed use time has been reached.

16. The program as defined by claim 15, further causing the computer to perform the steps of regularly sending inquiry data to the portable terminal having the content usage right and detecting that the portable terminal has left the store in response to failure of the portable terminal to reply to the inquiry data.

* * * * *